US009375881B2

(12) United States Patent
Elsey

(10) Patent No.: US 9,375,881 B2
(45) Date of Patent: Jun. 28, 2016

(54) METHOD FOR MAKING AN OBJECT

(71) Applicant: ZYDEX PTY LTD, St Peters (AU)

(72) Inventor: Justin Elsey, St Peters (AU)

(73) Assignee: Zydex Pty Ltd, St. Peters (AU)

( * ) Notice: Subject to any disclaimer, the term of this patent is extended or adjusted under 35 U.S.C. 154(b) by 0 days.

(21) Appl. No.: 14/486,173

(22) Filed: Sep. 15, 2014

(65) Prior Publication Data

US 2015/0001763 A1 Jan. 1, 2015

Related U.S. Application Data

(63) Continuation of application No. 13/181,079, filed as application No. PCT/AU2011/001067 on Aug. 20, 2011, now Pat. No. 8,877,115.

(30) Foreign Application Priority Data

Aug. 20, 2010 (AU) .................................. 2010903733

(51) Int. Cl.
| | |
|---|---|
| *B29C 33/40* | (2006.01) |
| *B29C 33/68* | (2006.01) |
| *B29C 67/00* | (2006.01) |
| B29C 35/08 | (2006.01) |
| B29K 105/00 | (2006.01) |

(52) U.S. Cl.
CPC ......... *B29C 67/0092* (2013.01); *B29C 35/0888* (2013.01); *B29C 67/0055* (2013.01); *B29C 67/0062* (2013.01); *B29C 67/0066* (2013.01); *B29C 67/0077* (2013.01); *B29C 35/0805* (2013.01); *B29C 2035/0827* (2013.01); *B29K 2105/0058* (2013.01)

(58) Field of Classification Search
CPC ........ B29C 33/40; B29C 41/02; B29C 41/38; B29C 67/0051; B29C 67/0055; B29C 67/0059; B29C 67/0062; B29C 67/0066; B29C 67/007; B29C 67/0074; B29C 67/0077; B29C 67/0081
USPC .................................. 264/308, 313, 316, 401
See application file for complete search history.

(56) References Cited

U.S. PATENT DOCUMENTS

| | | | |
|---|---|---|---|
| 5,143,817 A * | 9/1992 | Lawton et al. ................. | 264/401 |
| 5,192,559 A | 3/1993 | Hull et al. | |

(Continued)

FOREIGN PATENT DOCUMENTS

| | | |
|---|---|---|
| EP | 0686480 B1 | 11/2001 |
| SU | 1507938 A1 * | 9/1989 |

OTHER PUBLICATIONS

International Search Report mailed Sep. 5, 2011 in related International Application No. PCT/AU2011/001067.

(Continued)

*Primary Examiner* — Leo B Tentoni
(74) *Attorney, Agent, or Firm* — Eric L. Lane; Green Patent Law

(57) ABSTRACT

An apparatus (100) for making an object (122) is disclosed. The apparatus has a flexible element (101) having an upwardly facing surface for disposing thereon a material (104) used to make the object, and a member (110) connected to an actuator (112) that can move the member (110). A controller is in communication the actuator (112). A method which may be executed using the apparatus (100) is also disclosed.

9 Claims, 19 Drawing Sheets

(56) References Cited

U.S. PATENT DOCUMENTS

| | | | | |
|---|---|---|---|---|
| 5,447,822 | A | * | 9/1995 | Hull et al. ................. 264/401 X |
| 5,474,719 | A | | 12/1995 | Fan et al. |
| 5,897,825 | A | | 4/1999 | Fruth et al. |
| 2002/0153640 | A1 | | 10/2002 | Hendrik |
| 2008/0174050 | A1 | | 7/2008 | Kikuchi |

OTHER PUBLICATIONS

International Preliminary Report on Patentability mailed Nov. 7, 2011 in related International Application No. PCT/AU2011/001067.

Written Opinion of the International Search Authority dated Sep. 5, 2011 in related International Application No. PCT/AU2011/001067.

* cited by examiner

METHOD FOR MAKING AN OBJECT

CROSS-REFERENCE TO RELATED APPLICATIONS

This application claims priority to and is a continuation of U.S. application Ser. No. 13/818,079, filed Jul. 2, 2013, now U.S. Pat. No. 8,877,115, which claims priority to and is a U.S. national stage entry of International Application No. PCT/AU2011/001067, filed Aug. 20, 2011, which claims priority to Australian Application No. 2010903733, filed Aug. 20, 2010, each of which is hereby incorporated by reference in its entirety.

FIELD OF THE INVENTION

The present invention generally relates to an apparatus for making an object and a method for making an object.

BACKGROUND OF THE INVENTION

A three dimensional object can be built up one section at a time. A layer of material is solidified in the shape of a section of the object. Once the section is formed, another is formed in contact with the previous section. Repetition of this process allows multi-laminate objects to be fabricated. This is the basis of techniques such as rapid prototyping.

SUMMARY OF INVENTION

According to a first aspect of the invention, there is provided a method for making an object, the method comprising the steps of:

on an upwardly facing surface of a flexible element, disposing a material used to make the object; and causing relative movement between a member and both the object being made and a downwardly facing surface of the element while the member is in contact with the downwardly facing surface, the relative movement causing the upwardly facing surface to adopt a form.

In the context of this specification, an object is a tangible object. It may, for example, be rigid or resilient. It may have one or more hollows or voids, such as that of a cup or tennis ball, for example.

Generally but not necessarily, the material is a liquid. The liquid may comprise a layer of liquid. In alternative embodiments, the material may comprise a powder such as a fluidized polymer powder, or a fluid or paste. Any suitable material may be used.

A relatively modest volume of material, for example a liquid, may be required. Generally, but not necessarily for all embodiments, a layer of the liquid is disposed over the surface. If the liquid material was alternatively disposed under the flexible element in a vat, for example, a relatively large volume of liquid—for example, of the order of 10 L—may be required. This may be far in excess of the volume of the object, in which case the liquid may only be slowly consumed over an extended period in which several objects are made, and during which the liquid may become contaminated or otherwise degraded. A typical cost for liquid used in the production of the object may be of the order of several hundred dollars per litre, and thus costly waste may be reduced by disposing the material over the surface. A further advantage of using an upwardly facing surface is that a surface level of the liquid does not need to be controlled, whereas an apparatus having a liquid disposed in a vat under the flexible element requires the surface level to be maintained while the object is being made. This may, for example, require relatively complex material overflow management, especially if a part of the apparatus (such as a drive shaft) moves into the material.

In an embodiment, the method comprises the step of decreasing the separation of the object being made and the upwardly facing surface. The object may be moved towards the upwardly facing surface. For example, the object being made may be brought to within one section thickness of the nominal position of the upwardly facing surface in preparation for solidification of some of the material to form the next section of the object. Reducing the separation of the object being made and the surface may squeeze the material which in turn presses on the surface to cause it to be pushed. This may cause the upwardly facing surface to deviate from the form.

In the context of this specification, a section is to be understood to encompass a slice of the object. A planar section encompasses a portion of the object located between two parallel planes that intersect the object. Generally, but not necessarily, the sections formed are planar sections.

In an embodiment, the relative movement flattens the upwardly facing surface. The member may be moved horizontally. The member may be relatively moved across the downward facing surface.

Generally, but not necessarily, the desired form of the upwardly facing surface is flat. A flat surface may be required to form planar sections. If this deviation from a planar form is not corrected the sections may not have the desired geometry. The member may be relatively moved to have the surface adopt the desired form.

In an embodiment, the method comprises the step of illuminating the material with a radiation to solidify at least some of the material adjacent the object being made. The step of illuminating and solidifying may complete an entire section of the object being made. The object may be fabricated by sequentially illuminating each of a plurality of material layers to form respective sections. Each section may be an entire section of the object. Each section may be formed adhered to the upwardly facing surface. The surface may be subsequently separated from the attached section before the next section is made. Each entire section may comprise an entire planar section.

During the step of illuminating the material, the member may contact a portion of the element directly beneath the object being made to prevent the portion sagging. The flexible element may sag by the force of gravity. This is undesirable because the sections formed adjacent the upwardly facing surface will deviate from the desired form causing fabrication of a malformed object.

The step of illuminating may comprise illuminating the material with a radiation that has passed through a window of the member. There may be no relative movement between the member and the element during the formation of an entire section of the object.

Alternatively, during the formation of an entire section, the material adjacent a portion of the flexible element supported by the member may be solidified, and then the member may be relatively moved to support another portion in preparation to solidify the material adjacent the other portion.

Illumination may also attach the solidified material to the object being made.

In an embodiment, during the relative movement the member passes directly beneath the object being made. This may expel some of the material which is located between the element and the object being made. This may also flatten a portion of the element directly beneath the object.

In an embodiment, the method comprises, after the step of illumination and solidifying the material to form an entire section of the object being made, the step of further moving the member relative to the downwardly facing surface while the member is in contact with the downwardly facing surface to a position where the member is not directly beneath the object being made.

The further movement may be a sliding movement of the member along the downwardly facing surface. Sliding movement requires less force than pulling the element and the member apart because in the later case the force exerted by atmospheric pressure must be overcome. Sliding the member away from beneath the solid section exposes the downwardly facing surface of the flexible element to the atmosphere. Exposing the downward surface to atmosphere thus allows the flexible element to distort freely and facilitates peeling of the section from the element. If the member was to remain beneath the flexible element a relatively extreme separation force may be required to separate the section from the flexible element. The extreme force may be transferred to the object being made during separation and damage it. In other embodiments, the movement is a rolling movement which may have similar advantages to using a sliding movement.

Also, the force applied by the sliding member is predominantly tangential to the downwardly facing surface of the flexible member causing the flexible member to tension and take at least some of, if not most of, the force, reducing the force being applied to the object being made. To facilitate this, the sheet may be flexible but may have a sufficiently high Young's modulus to resist stretching.

Especially delicate objects may thus be made that may not be made using another approach.

In an embodiment, the method comprises the step of separating the object being made and the upwardly facing surface. The step of the separating may comprise the step of moving the object being made away from the flexible element and the member.

This may cause the flexible element to distort to peel away from the section. The forces experienced by the section during peeling separation from the surface is typically much less than the force generated when separating the section from the surface in other ways. Consequently, the use of a flexible element may reduce the risk of damage to the section and/or the object being made.

The object being made and the surface may be separated only after the formation of an entire section of the object being made. This may aid in the fabrication of spans of overhanging features of the object with fewer, or without any, supporting scaffolds. Example overhanging features include the arms of a "T" shaped object. The fabrication of overhangs may be problematic for some methods that do not form an entire section before separation. Moving the object being made from the flexible element and the member may reduce or eliminate the need to handle the sheet or to have things contacting it which can cause the element to crease, wear or damage. It may also reduce or eliminate the need to have mechanisms in contact with the upwardly facing surface of the element which may interfere with the distribution of the liquid on the sheet.

In an embodiment, the method comprises the step of disposing a friction-reducing substance between the element and the member.

According to a second aspect of the invention, there is provided a method for making an object, the method comprising the steps of:

on an upwardly facing surface of a flexible element, disposing a material used to make the object;

illuminating the material with a radiation to solidify at least some of the material adjacent the object being made to form an entire section of the object; and then causing relative movement between a member and a downwardly facing surface of the element while the member is in contact with the downwardly facing surface to a position where the member is not directly beneath the object being made.

In an embodiment, during illumination the member is directly beneath the object being made.

In an embodiment, the method comprises the step of separating the object being made and the upwardly facing surface. The step of separating may be done while the member is not directly beneath the object being made. The step of separating may comprise the step of moving the object being made from the flexible element and the member.

Were possible, steps of the first aspect of the invention may be combined with any one or more steps of the second aspect of the invention.

According to a third aspect of the invention, there is provided an apparatus for making an object, the apparatus comprising:

a flexible element having an upwardly facing surface for disposing thereon a material used to make the object;

a member in contact with a downward facing surface of the element;

an actuator arranged to cause relative movement between the member and both the downwardly facing surface and the object being made while the member is in contact with the downwardly facing surface, the relative movement causing the upwardly facing surface to adopt a form.

In an embodiment, the apparatus comprises a controller in communication the actuator, the controller is configured to execute the step of the actuator causing the relative movement.

The apparatus may, but not necessarily, be generally configured such that the upwardly and downwardly facing surfaces are horizontally orientated. The apparatus may, for example, have a chassis with attached feet configured to support the chassis above a surface such as a bench, and the flexible member is mounted relative to the chassis so that when the chassis is so supported the surfaces have a horizontal orientation.

The material may be a liquid. The liquid may be a layer of liquid. In alternative embodiments, the upwardly facing surface is for disposing thereon a powder or other material used to make the object.

In an embodiment, the apparatus comprises a positioner configured to alter the separation of the object being made and the surface. The controller may be in communication with the positioner and is configured to execute the step of decreasing the separation of the object being made and the surface. This may place the object being made in a suitable position for the formation of the next section to be made. The surface may deviate from the form when the separation of the object being made and the surface is decreased.

The section of the object and the surface may be later separated by the positioner.

An embodiment comprises a radiation source configured to illuminate the material with a radiation to solidify at least some of the material adjacent the object being made. The radiation source may be a light source. The radiation may be a light.

In an embodiment, the controller is in communication with the radiation source. The controller may be configured to execute the step of illumination of the material while the member contacts a portion of the downwardly facing surface directly beneath the object being made. This may prevent the portion sagging, providing, in some embodiments, a more planar section as generally, but not necessarily, desired.

In an embodiment, the member comprises a window configured to pass the radiation. The window may comprise an aperture. The window may comprise material transparent to the radiation. The window may comprise at least two rollers spaced apart so that the radiation can be transmitted between them.

In an embodiment, the controller is configured to execute the step of illuminating the material through the window. The controller may not execute the step of causing the relative movement of the member during the irradiation in which an entire section of the object is solidified. Alternatively, during the formation of an entire section of the object, the material adjacent a portion of the flexible element supported by the member may be solidified, and then the member may be relatively moved by the controller to support another portion in preparation to solidify the material adjacent the other portion.

In an embodiment, the flexible element is transparent to the radiation. The radiation source may be located below the element. The radiation may pass through the element.

An embodiment of the apparatus comprises a radiation manipulator configured to manipulate the radiation. The radiation manipulator may impart a spatial feature to the radiation. The radiation manipulator may impart a temporal feature to the radiation. The shape of each section may thus be individually controlled by the action of the radiation manipulator on the light.

In an embodiment, the radiation manipulator is configured to scan the radiation relative to the surface.

In an embodiment, the controller is configured to execute the step of relatively moving the member such that the member passes directly beneath the object being made.

In an embodiment, the relative movement flattens the surface.

In an embodiment, the controller is configured to execute, after the step of illuminating and solidifying the material to form an entire section of the object being made, the step of further moving the member relative to the downwardly facing surface while the member is in contact with the downwardly facing surface, the further relative movement positioning the member relative to the downward facing surface to a position where the member is not directly beneath the object being made. The controller may be configured to execute the step of increasing the separation of the object being made and the upwardly facing surface. The object may be moved away from the upwardly facing surface.

In an embodiment, the member comprises an elongate edge that contacts the downwardly facing surface.

In an embodiment, the member comprises at least one roller that contacts the flexible element.

In an embodiment, the member comprises a planar surface that contacts the downwardly facing surface.

In an embodiment, the flexible element forms at least part of a vessel configured to contain the material. The vessel may be a trough. The vessel may be a dish. The vessel may prevent the material from falling off or flowing off the element. This may reduce costly material consumption.

In an embodiment, the flexible element comprises a flexible sheet. The flexible sheet may have a unitary construction. For example, the flexible sheet may not be backed by another element. The flexible sheet may be, for example, a membrane. Alternatively, the sheet may be a composite.

In an embodiment, the flexible element may have a Young's modulus of between 100 and 1000 MPa. The Young's modulus may be between 400 and 700 MPa. The Young's modulus may be around 560 MPa.

An embodiment of the invention comprises a flexible element tensioner. The tensioner may comprise an element-contacting component for contacting the downwardly facing surface. The tensioner may comprise one or more biasing elements that bias the element-contacting component towards the downwardly facing surface. The element-contacting component may comprise a ring. The one or more biasing elements may comprise a spring arrangement. The arrangement may comprise an extension spring operationally coupled to the element and the component. Alternatively or additionally, the downwardly facing surface may be biased into the frame by gravity.

In an embodiment, a friction-reducing substance is disposed between the member and the element.

In an embodiment, the controller is configured to receive instructions for making the object. The controller may receive the instructions in the form of data indicative of a plurality of sections to be formed sequentially by the device. The sections may be individually determined. Each individually determined section may differ from another of the sections by, for example, the shape of their respective boundaries. Not every section needs to be different, however. The controller may be configured to coordinate movement of the member and the positioner, and the light source, and in some embodiments other parts, such that the plurality of sections are formed sequentially in accordance with the received instructions. The controller may comprise a processor.

According to a fourth aspect of the invention, there is provided an apparatus for making an object, the apparatus comprising:

a flexible element having an upwardly facing surface for disposing thereon a material used to make the object;

a member in contact with a downwardly facing surface of the element, the member being for shaping the element;

an actuator arranged to cause relative movement between the member and the element;

a radiation source configured to illuminate the material with a radiation to solidify at least some of the material adjacent the object being made; and a controller in communication the actuator and the radiation source, the controller is configured to execute the steps of:

illuminating the material when so disposed with the radiation to solidify at least some of the material adjacent the object being made to form an entire section of the object; and then causing the relative movement between the member and the downwardly facing surface while the member is in contact with the downwardly facing surface to a position where the member is not directly beneath the object being made.

In an embodiment, during illumination the member is directly beneath the object being made.

In an embodiment, the apparatus may comprise a positioner configured to alter the separation of the object being made and the surface. The controller may be in communication with the positioner and further configured to execute the step of separating the object being made and the upwardly facing surface. The step of separating may be done while the member is not directly beneath the object being made. The step of separating may comprise the step of moving the object being made away from the flexible element and the member.

Were possible, any one or more features of the third aspect of the invention may be combined with any one or more features of the fourth aspect of the invention.

According to a fifth aspect of the invention, there is provided a method for making an object, the method comprising the steps of:

on a surface of a flexible element, disposing a material used to make the object; and causing relative movement between a member and the element, the relative movement causing the surface to adopt a form.

Were possible, any one or more features of the fifth aspect of the invention may be combined with any one or more features of the first aspect of the invention.

According to a sixth aspect of the invention, there is provided an apparatus for making an object, the apparatus comprising:

a flexible element having a surface for disposing thereon a material used to make the object; and an actuator arranged to cause relative movement between a member and the element, the relative movement causing the surface to adopt a form.

Were possible, any one or more features of the sixth aspect of the invention may be combined with any one or more features of the third aspect of the invention.

Any liquid used to make a solid object referred to in this specification may, as appropriate, be replaced with any suitable material or fluid used to make a solid object, and vice versa.

BRIEF DESCRIPTION OF THE FIGURES

In order to achieve a better understanding of the nature of the present invention, embodiments will now be described, by way of example only, with reference to the accompanying figures in which.

DETAILED DESCRIPTION OF EMBODIMENTS OF THE INVENTION

Figure 1:
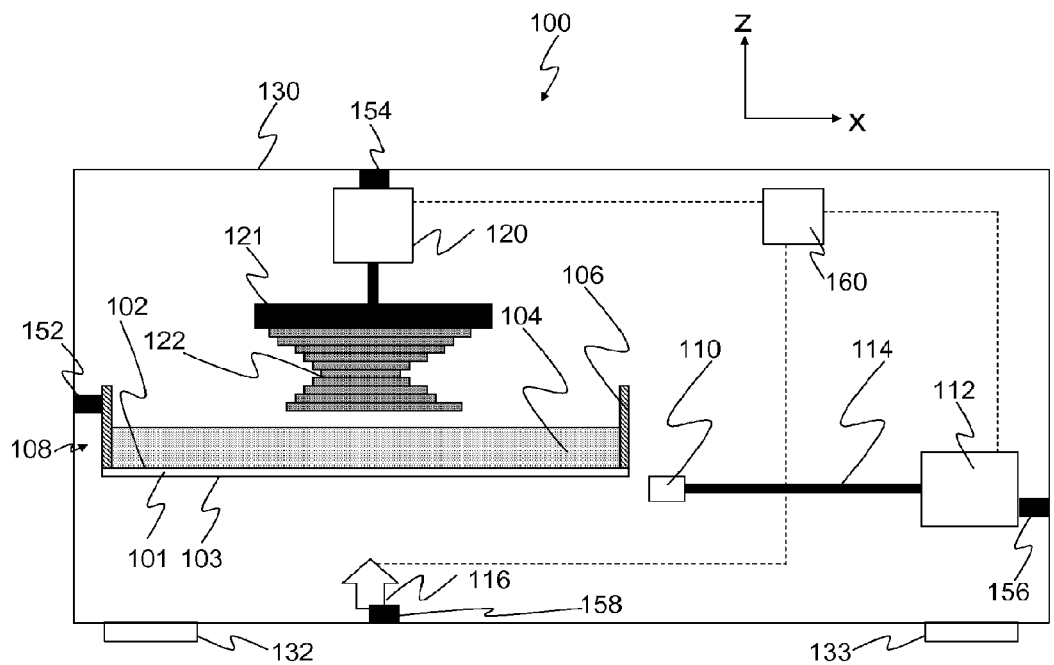
FIGS. 1 to 11 show schematic elevation views of one embodiment of a device for making an object during the various stages of its use.

FIGS. 1 to 11 show schematic views of one embodiment of an apparatus at which an object can be made, the apparatus being generally indicated by the numeral 100. The figures taken in sequence indicate one embodiment of a method for making an object. Coordinate axes are shown in the figures where x and y are horizontally orientated and z is vertically orientated.

The apparatus 100 has a flexible element in the form of a substantially transparent sheet 101 over which a layer of photohardenable liquid 104 is disposed. A photohardenable liquid (or photocurable liquid) is a liquid that hardens when exposed to a radiation such as visible or invisible light (ultraviolet light, for example). Example wavelengths of suitable light include 355 nm and 405 nm. In some embodiments, radiation sources other than light may be used. For example, the radiation source may be ionizing or non-ionizing radiation.

The photohardenable liquid may comprise a mixture of acrylate monomers and oligomers, photoinitiators, colourants and stabilizers such that the mixture polymerizes when exposed to suitable light. Example liquids include Somos NEXT from DSM Somos, USA, and KZ-1860-CL from Allied PhotoPolymers, USA.

Sheet 101 may possess anti-stick properties in relation to the photohardenable material 104 when it is cured in contact with the sheet. Suitable materials for sheet 101 include FEP fluoropolymer film manufactured by Du Pont, USA. The film may be of around 125 micrometers thickness, but may be thicker or thinner as appropriate. The sheets are flexible but may not be particularly elastic, having a Young's modulus of 560 MPa. Generally but not necessarily, a Young's modulus of between 100 and 1000 MPa may be suitable. Another example of a suitable material is a PFA fluoropolymer film, also manufactured by Du Pont. Generally any suitable material may be used for the element.

In this embodiment, the sheet 101 is not backed by another material or layer, and has a unitary construction. In other embodiments the sheet may have a multilaminate construction. For example, the sheet may comprise a layer of silicone bonded to a polyester film, the film providing a high Young's modulus and the silicone providing a superior nonstick surface in relation to the photohardenable material 104. Other materials or laminates of different materials may alternatively be used.

The sheet 101 and side walls 106 form a shallow vessel in the form of a trough or dish 108 for containing the photohardenable liquid 104. The vessel may have a volume sufficient to hold enough liquid to build an entire object without being replenished. Optionally, a conduit may connect the vessel and a supply of the liquid to replenish the liquid as it is consumed. The sheet 101 forms the base of the trough. The trough 108 and contained liquid 104 can be easily removed from the apparatus and replaced with another trough and liquid, thus providing a convenient means for replacing damaged troughs or making objects from different materials.

The apparatus has moveable member 110 that can be moved horizontally along the x-axis by a linear actuator 112 and drive shaft 114. The actuator may comprise any one or more of linear motors, drive belts, stepper motors, rack and pinion arrangements, for example, or generally any suitable components arranged to provide actuation.

The member pushes against the underside 103 of the sheet 101. In another embodiment, the member remains stationary while the object being made and the sheet are moved. In yet another embodiment, both the object being made and the sheet are moved in opposition to the movement of the member. Generally any suitable combination of movement may be used if there is relative movement of the member to both the sheet and the object being made.

The embodiments of FIGS. 1 to 11 and 18 to 24 are each configured such that in use the sheet 101 is horizontally orientated. The apparatus may, for example, have a chassis 130 with attached feet 132,133 configured to support the chassis above a surface such as a bench, and the sheet is mounted relative to the chassis so that when the chassis is so supported the sheet has a horizontal orientation. In other embodiments, the surface of the sheet which the liquid is disposed on may be inclined at up to 45 degrees to the horizontal (that is, the surface is upwardly facing), provided that the vessel walls are sufficiently high to contain the fluid. Mounting brackets 152,154,156,158 may be used to ensure that apparatus components are maintained in their correct position and orientation relative to the chassis.

Figure 29:
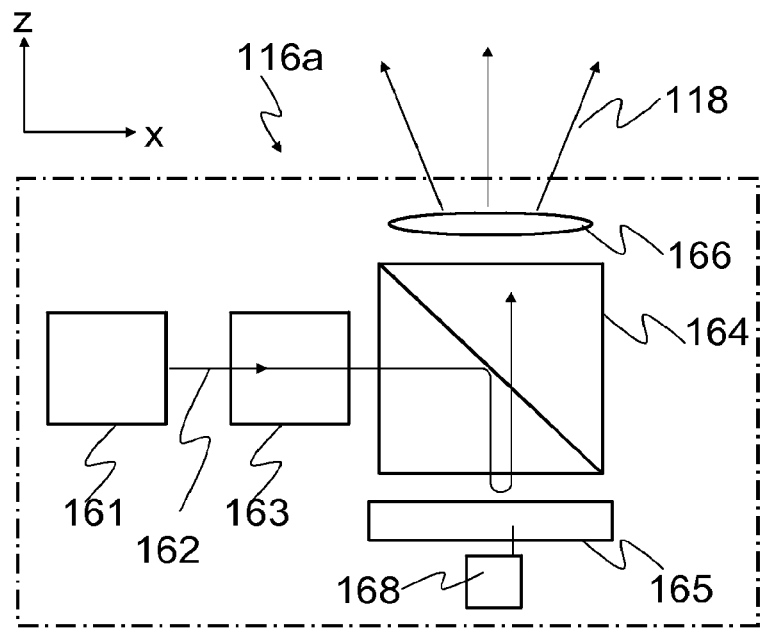
FIGS. 29 to 31 show schematic views of example radiation sources that may form part of a device for making an object.
Figure 30:
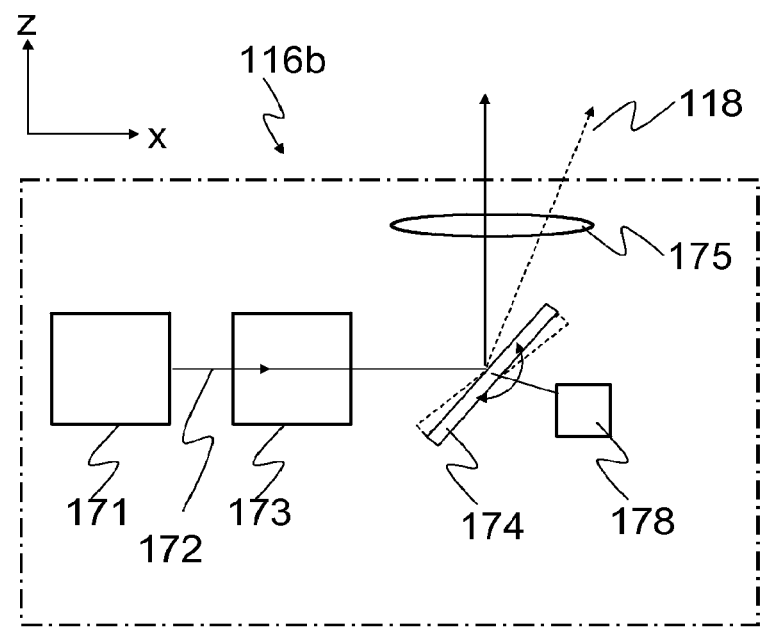
Figure 31:
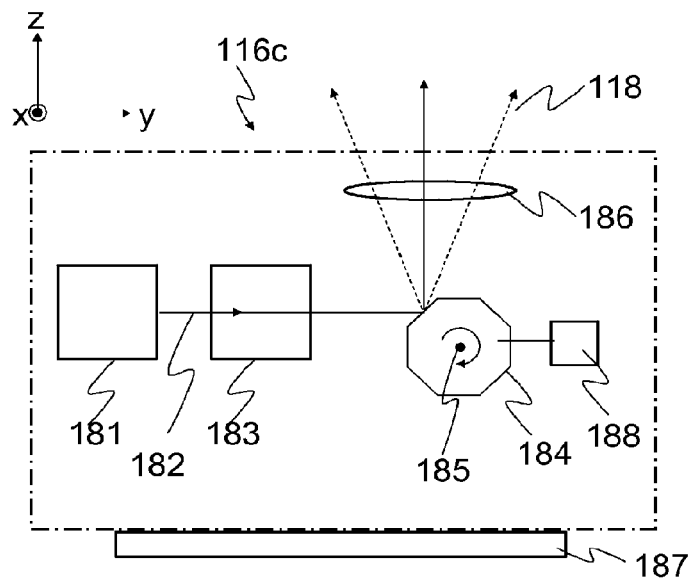

A radiation source in the form of a light source 116 may be activated so that it emits spatially and/or structured light 118 capable of selectively hardening areas of the photohardenable liquid 104 to form a section of the object. Light source 116 may, for example, incorporate a light manipulator such as an image projection system depicted in FIG. 29 and generally indicated with the numeral 116a, comprising light source 116 emitting light 162, relay optics 163, turning prism 164, spatial light modulator 165 controllable by controller 168, and projection lens 166. Alternatively, light source 116 may be a light beam scanning apparatus depicted in FIG. 30 and generally indicated by the numeral 116b, comprising a laser source 171 emitting light 172 of wavelength of around 350 nm, for example, collimating and/or focusing optics 173, scanning mirror 174 whose rotation is controllable in one or more axes by mirror controller 178, optionally a second controllable mirror not shown in the figure, and optionally a projection lens 175 such as an F-Theta lens. Controller 178 can be configured to scan the mirror 174 (coordinated with a second mirror, if present) in a raster scanning mode, or alternatively in a vector scanning mode. FIG. 31 shows a second type of beam scanning apparatus generally indicated by the numeral 116c comprising a laser source 181 emitting light 182, collimating and/or focusing optics 183, polygon mirror 184 rotatable around an axis 185 and controllable by controller 188, and optionally a projection lens 186 such as an F-Theta lens. As the apparatus of 116c may only scan light in the y-axis according to the coordinate system shown in FIG. 31, the apparatus resides on a translation stage 187 which can move the apparatus in the x-direction, enabling the projected light to address locations in the x and y dimensions. The translation stage may comprise any one or more of linear motors, drive belts, stepper motors, rack and pinion arrangements, for example, or generally any suitable components arranged to provide translation. Apparatus 116c is suitable for operating in a raster scanning mode. The light source may, in some embodiments, comprise an incandescent light or light emitting diode, for example. Any suitable light source may be used.

Referring again to FIGS. 1 to 11 and 18 to 24, a positioner 120 capable of linear motion along the z-direction is coupled to and moves a platform 121 on which the object being made is mounted. The positioner 120 positions the object being made 122 relative to the upwardly facing surface 102 of the sheet 101. The positioner may comprise any one or more of linear motors, drive belts, stepper motors, rack and pinion arrangements, for example, or generally any suitable components arranged to provide linear motion.

A sequence of actions can be performed with the apparatus 100 to form a new section of the object 124 and non-destructively separate it from the sheet 101. The process begins as shown in FIG. 1, with the previous sections of the object under fabrication 122 distanced from the sheet 101 and the member 110 retracted from the underside of the sheet 101.

Figure 2:
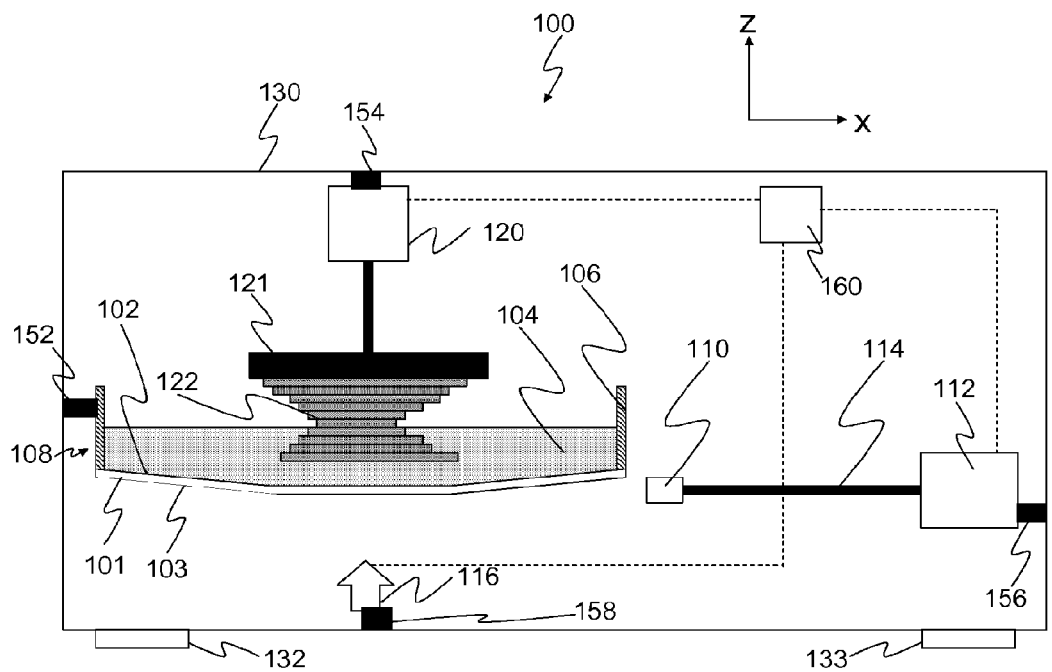

Next, as shown in FIG. 2, positioner 120 lowers the object being made 122 towards the sheet 101 to a final position which is one section-thickness above the surface 102 when flat.

The sheet 101, not being supported however, will undesirably deflect away from the object being made 122 as shown in FIG. 2, due to the trapped fluid between them causing the separation of the solid object being made from the surface 102 to be typically many sections thick. The surface also deviates from a flat form.

The thickness of one section is typically in the range of 10 microns to 250 microns, but it may be less if particularly fine fabrication resolution is required, and greater if a relatively coarse fabrication resolution is required.

Figure 3:
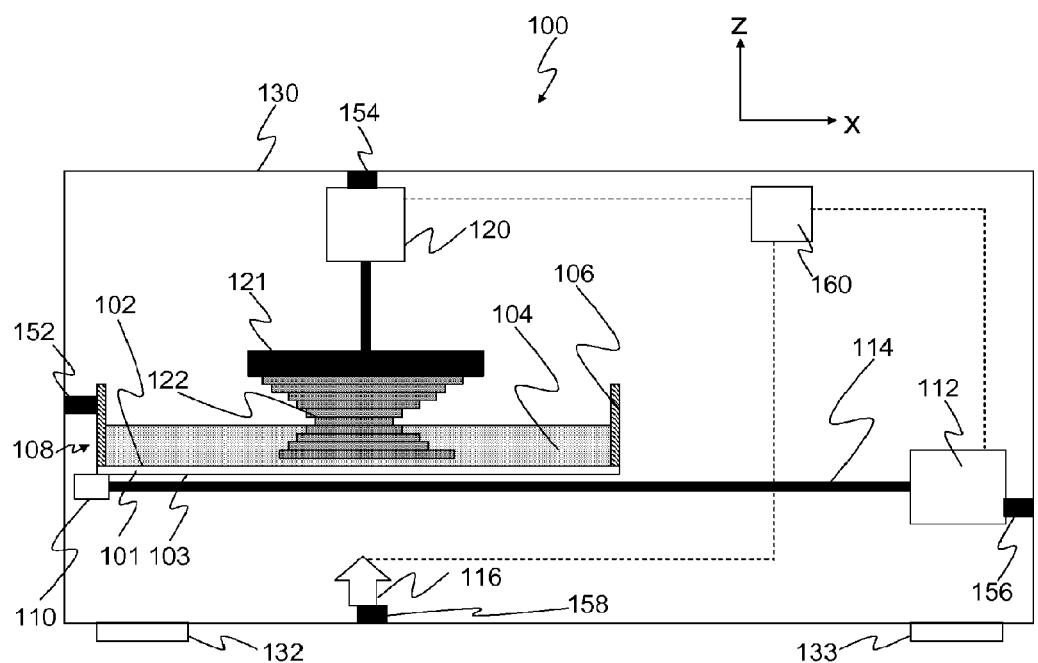

Next, as shown in FIG. 3, actuator 112 is engaged to move the flexible element shaping member 110 along the underside 103 of the sheet 101. This action lifts and shapes the sheet 101 to have it adopt a flat configuration or form while forcing excess photohardenable liquid 104 out of the gap between the previously hardened sections 122 and the sheet 101. At least some of the force applied to the sheet by the moving member may be taken by the sheet and not transferred to the object under construction. Having a flexible sheet that is not particularly elastic, as discussed above, may allow for especially delicate objects to be fabricated.

Figure 4:
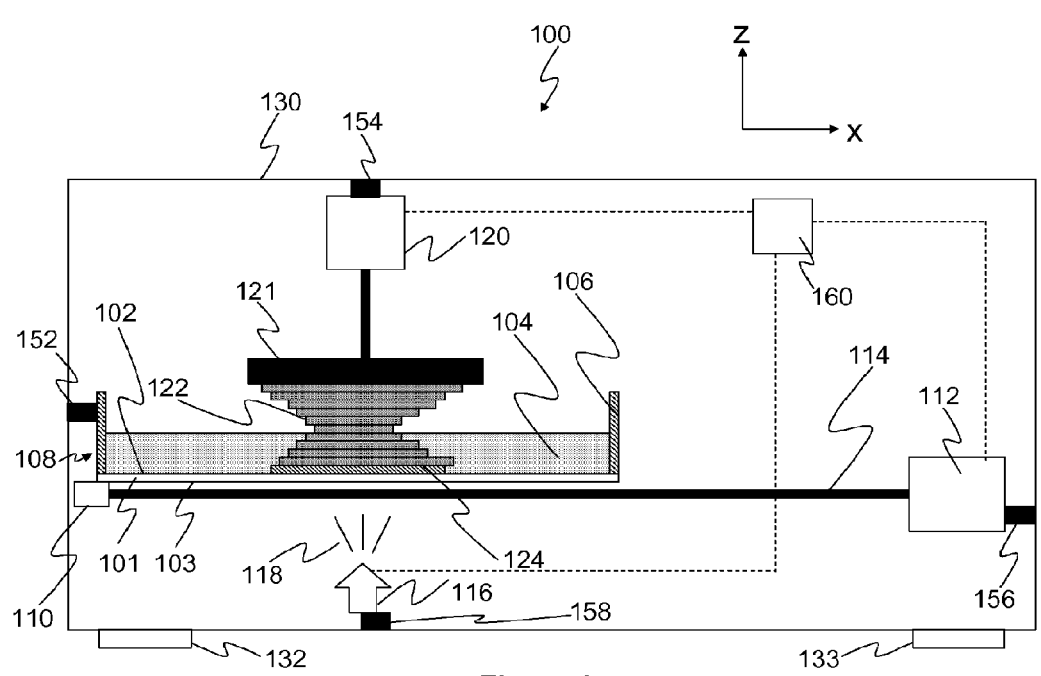

Next, as shown in FIG. 4, light 118 having spatial features in accordance with the sectional geometry of the object being made is emitted from light source 116 to selectively harden regions of the layer of photohardenable liquid 104 in contact with the previously formed sections 122 to form a new hardened section 124. In this embodiment, the arm connecting 110 and 112 is actually a pair of spaced-apart arms and the light passes between the arms. Alternatively, the arm may be a single arm disposed to one side of the light so that the light may pass.

Figure 5:
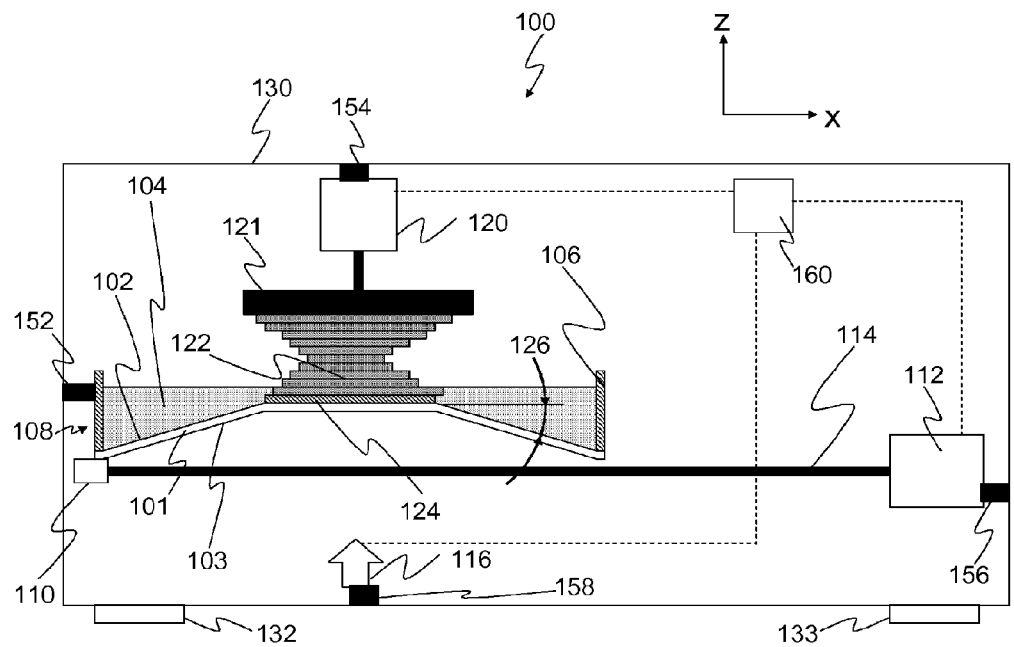
Figure 6:
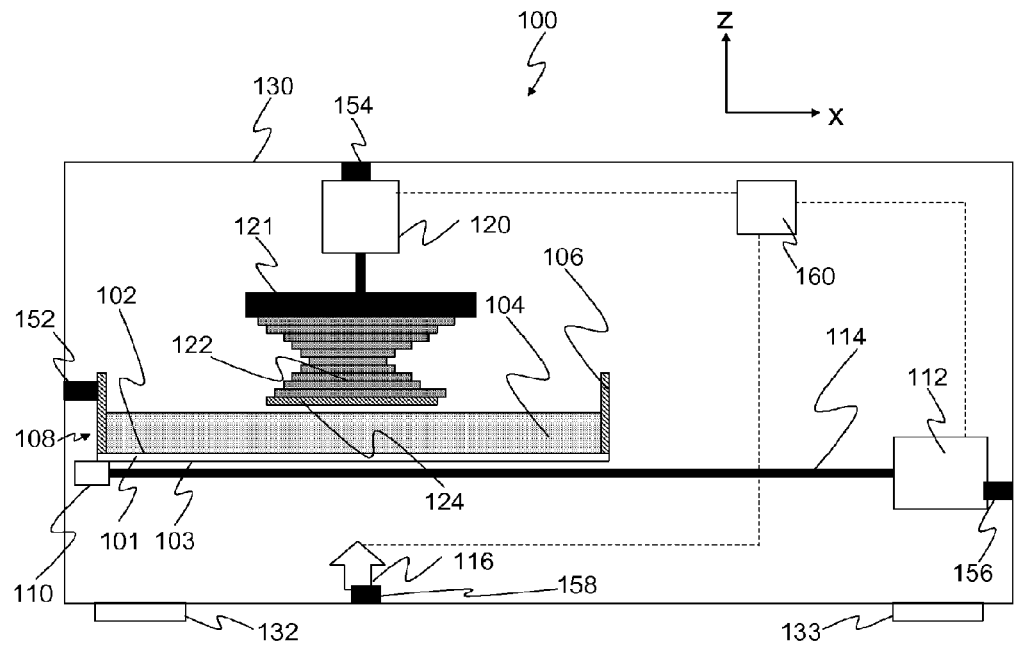
Figure 7:
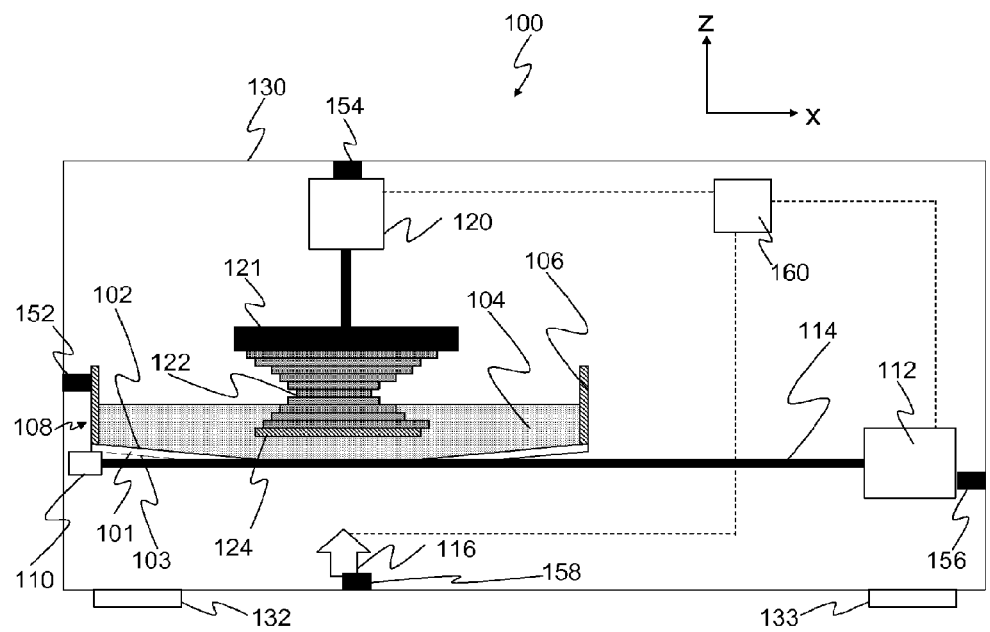
Figure 8:
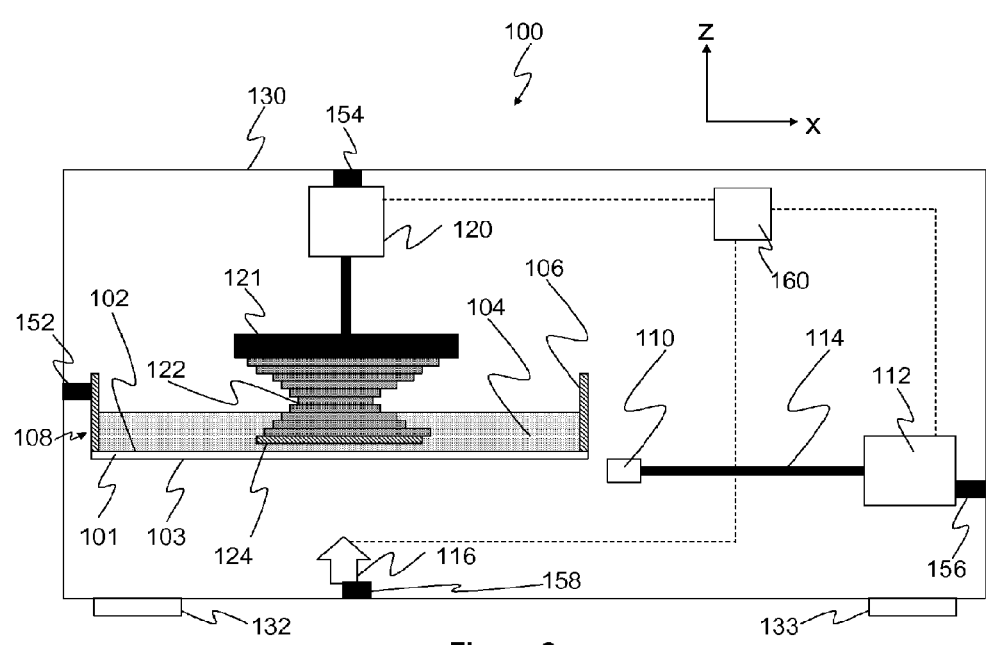
Figure 9:
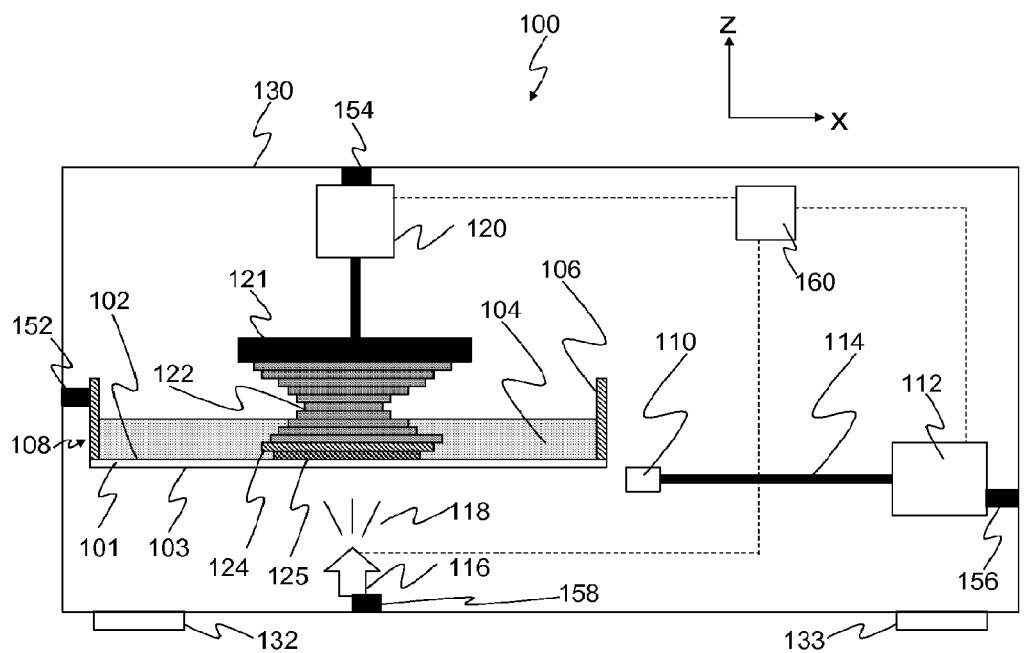
Figure 10:
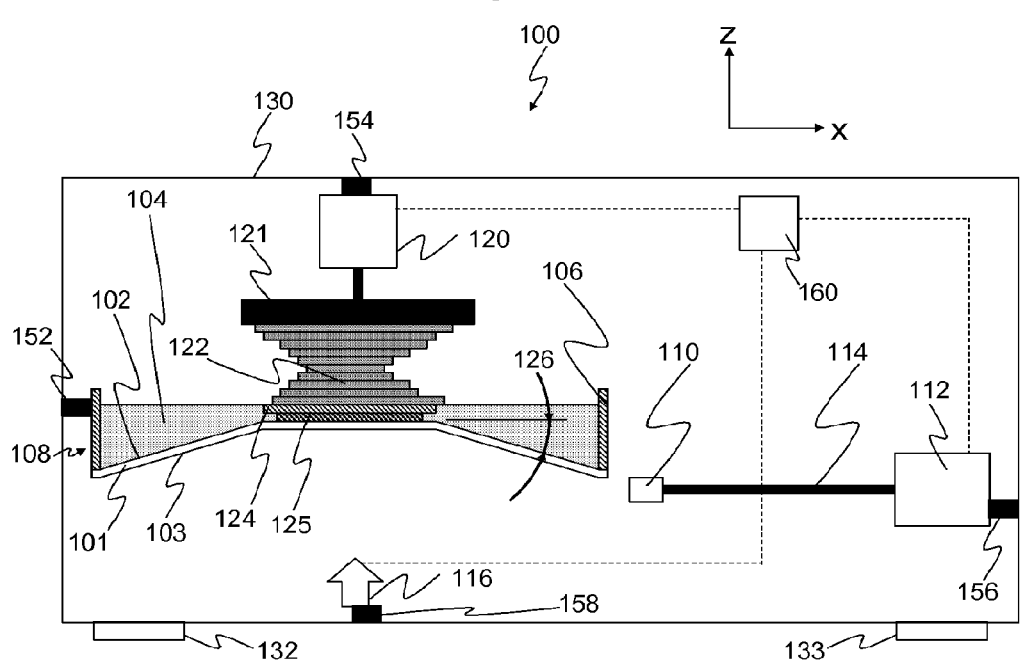
Figure 11:
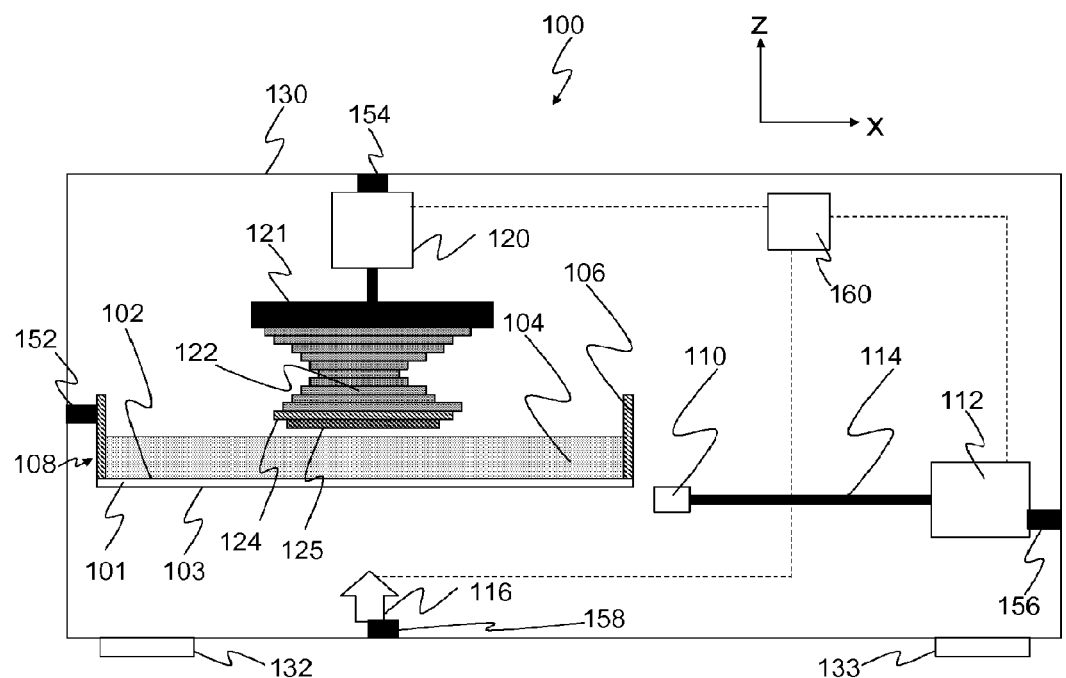

Next, as shown in FIG. 5, mechanical actuator 120 is engaged to raise the previously formed sections 122 and newly formed section 124, causing the sheet 101 to stretch and distort. Once the peeling angle 126 is sufficiently large the sheet will peel away from the newly formed section 124 and the apparatus 100 is ready for the process to start again, as shown in FIG. 6. The subsequent sequence, depicted in FIGS. 7 to 11, is identical to the first sequence depicted in FIGS. 1 to 6 except that the movement direction of the member 110 is reversed. Repeating this sequence of actions enables a multilaminate object to be fabricated section by section.

The member 110 in this embodiment of an apparatus lifts the sheet 101 to its level position, so that the sheet 101 adopts a flat configuration. This action may also force excess photohardenable liquid 104 out of the gap between the sheet 101 and the previously hardened sections 122. A flat section of consistent thickness may subsequently be formed.

In other embodiments, the member may be configured and manipulated such that the sheet is caused to adopt a configuration other than a flat configuration. This changes the distribution of the liquid material accordingly so that the spatial configuration of the liquid material between the sheet and the object is changed or modified to the desired shape. For example, a curved sheet configuration may be advantageous if the object being made has a rounded shape or if the light source 116 projects light 118 to a curved focal plane. The member may be, in the embodiment, arranged to move relative to the sheet in a non-linear manner. For example, the member may move along an arc as it moves relative to the sheet causing the sheet to have an arc configuration. The member may generally move along any other non-linear path to cause the sheet to take on a corresponding configuration.

Alternatively, the sheet may be shaped or configured so that its upper surface has a desired configuration while maintaining a flat lower surface configuration against which the member may move. Thus, as the section of the object is formed, the lower surface of the object section takes on the same configuration as the upper surface of the sheet. It will be understood that the configuration of the upper surface of the sheet may be any suitable desired geometrical arrangement.

Figure 12:
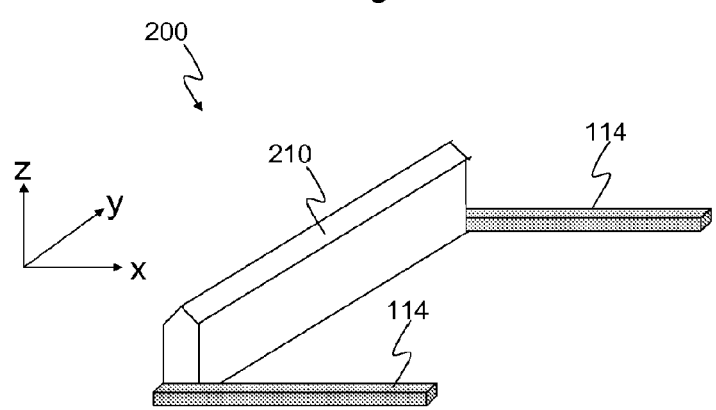
FIGS. 12 to 17 show perspective views of examples of members that may form part of a device for making an object.
Figure 13:
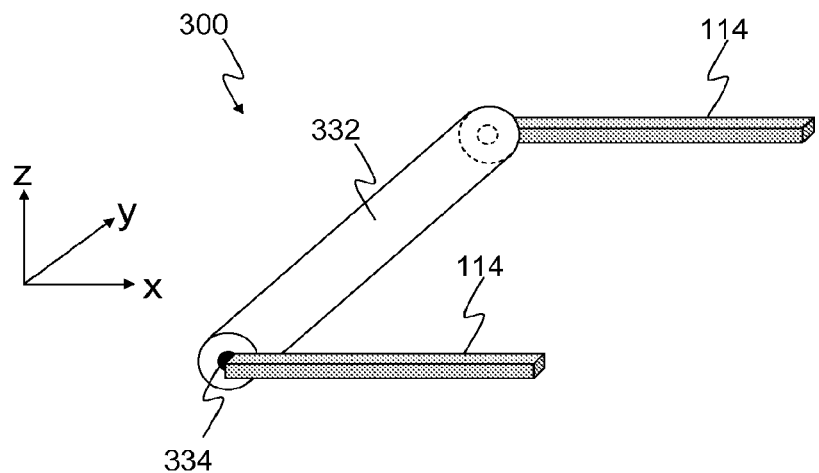

Several other examples of flexible element shaping members are illustrated in FIGS. 12 to 17 and FIGS. 25 to 27. FIG. 12 shows a blade-like member 200 comprising a wedge 210. FIG. 13 shows a member 300 comprising a cylindrical roller 332 free to rotate on bearings 334. For these embodiments of members, after the member transits across the underside of the sheet, the membrane may be maintained in its level position, or sufficiently close to it, by the tension in the sheet.

Figure 14:
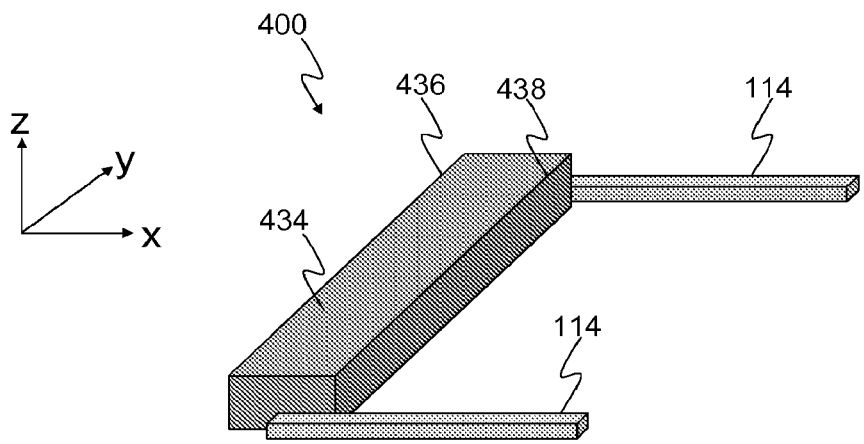
Figure 32:
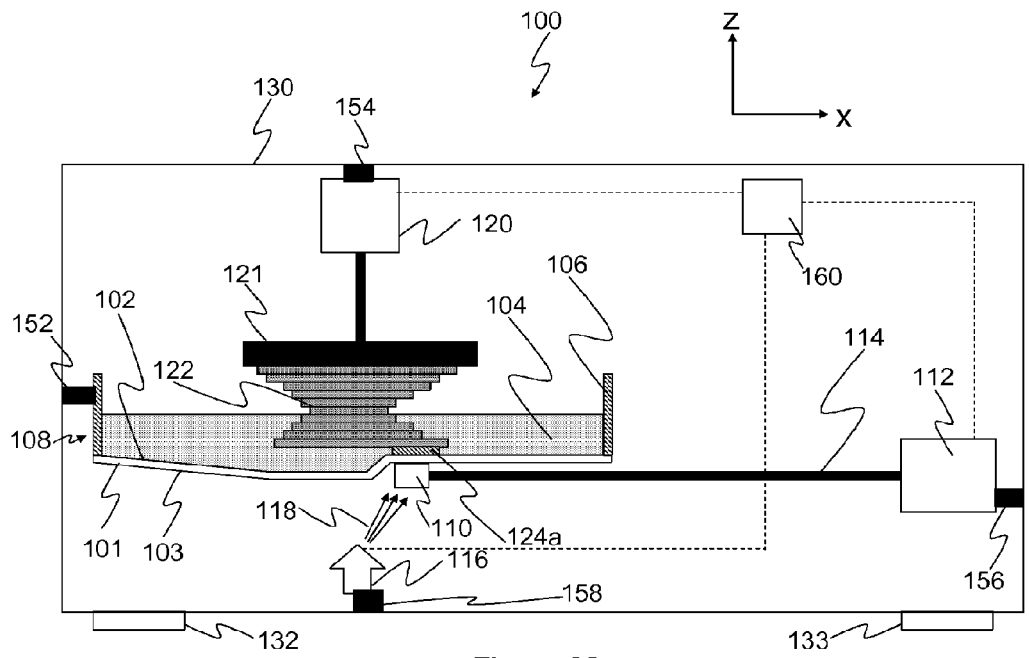
FIGS. 32 to 33 show schematic elevation views of another embodiment of a device for making a solid object.
Figure 33:
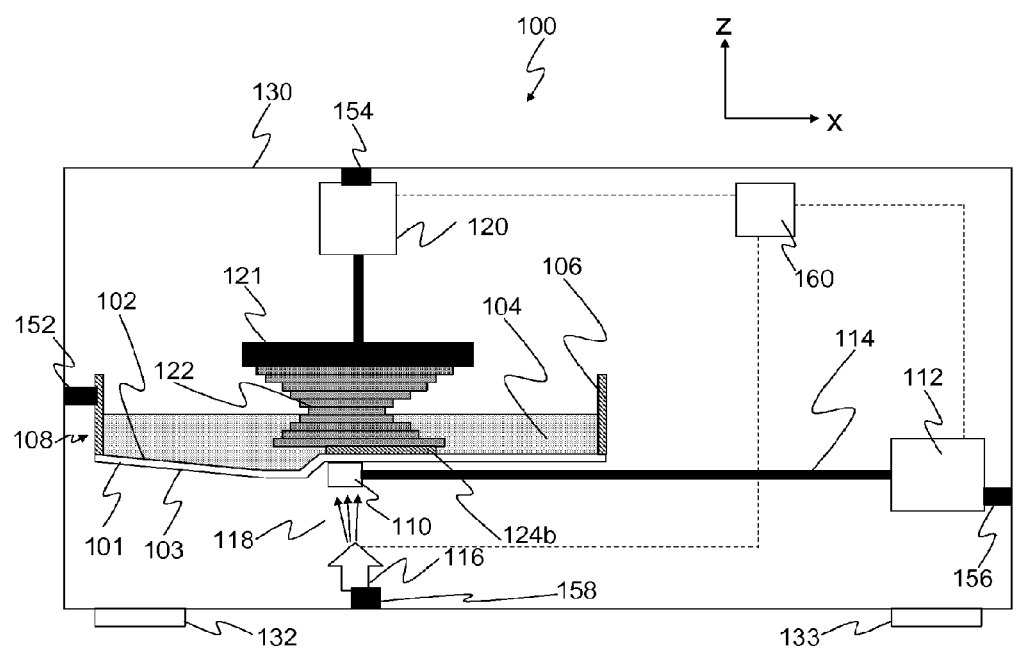

The sheet may sag because of the weight of the material and the sheet itself. The amount of sheet sag may, in some circumstances, be too great to satisfy the required fabrication tolerances. In these instances the member may support part or all of the area of the membrane presented for radiation exposure. FIG. 14 shows one embodiment 400 of such a member. It comprises a window 434 fabricated of a material transparent to the curing radiation 118 emitted by light source 116. For example, when the curing radiation is 405 nm wavelength light, the window 434 may comprise a plate of fused silica. The edges of the window 434 may be beveled, or even wedged, to reduce the risk of a scratch or other mark being made on the underside surface 103 of the sheet. In operation, a member of this embodiment may be relatively narrow. The light may be emitted through the member as it traverses the underside of the sheet, that is, during the transition from the state shown in FIG. 2 to the state shown in FIG. 3. Intermediate states during the transition are shown in FIGS. 32 and 33, showing section 124 being hardened in stages, indicated by 124a and 124b, by light exposure through the member as it moves. Only a narrow exposure window is presented at any instant, making the member of FIG. 14 more suitable for use with raster-type light sources as opposed to vector scanning type light sources. For example, the light source may comprise a scanning laser system operating in raster mode with the fast scan direction aligned with the y-axis (out of the page) and the slow scan direction aligned with x-axis according to the axes show in FIG. 1, and the scan speed in the x-dimension coordinated with the motion of the member so that it is projecting through the window. The apparatus 116b of FIG. 30 or apparatus 116c of FIG. 31 may be adapted to operate in such a fashion. A similar result may be achieved with a progressive display using a digital multimedia projector. The apparatus 116a depicted in FIG. 29 may be operated in this manner.

Figure 35:
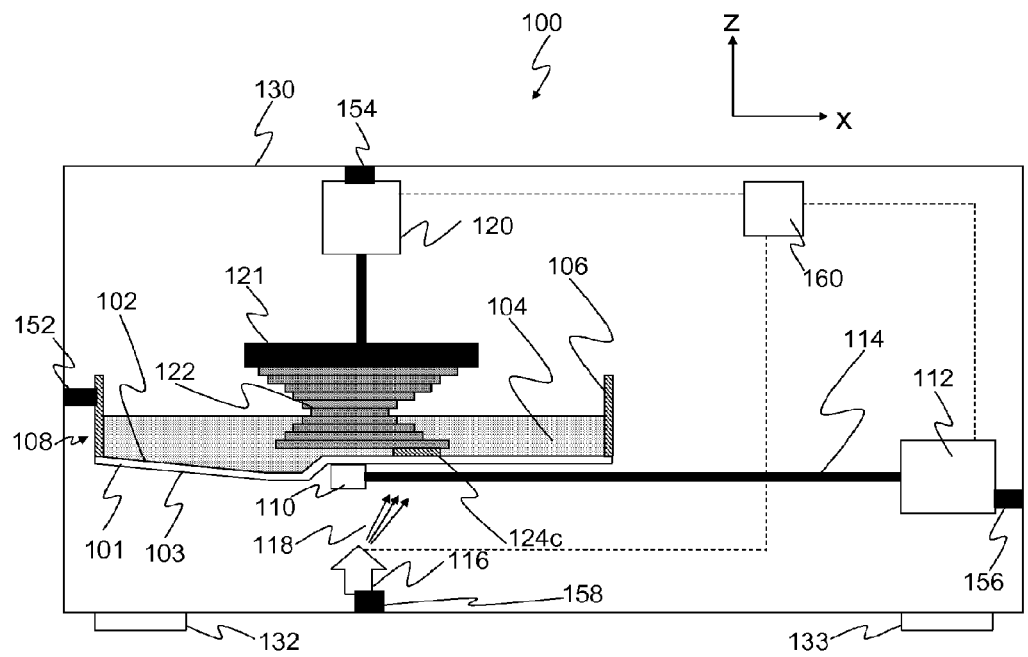
FIGS. 35 and 36 show schematic elevation views of another embodiment of a device for making a solid object.
Figure 36:
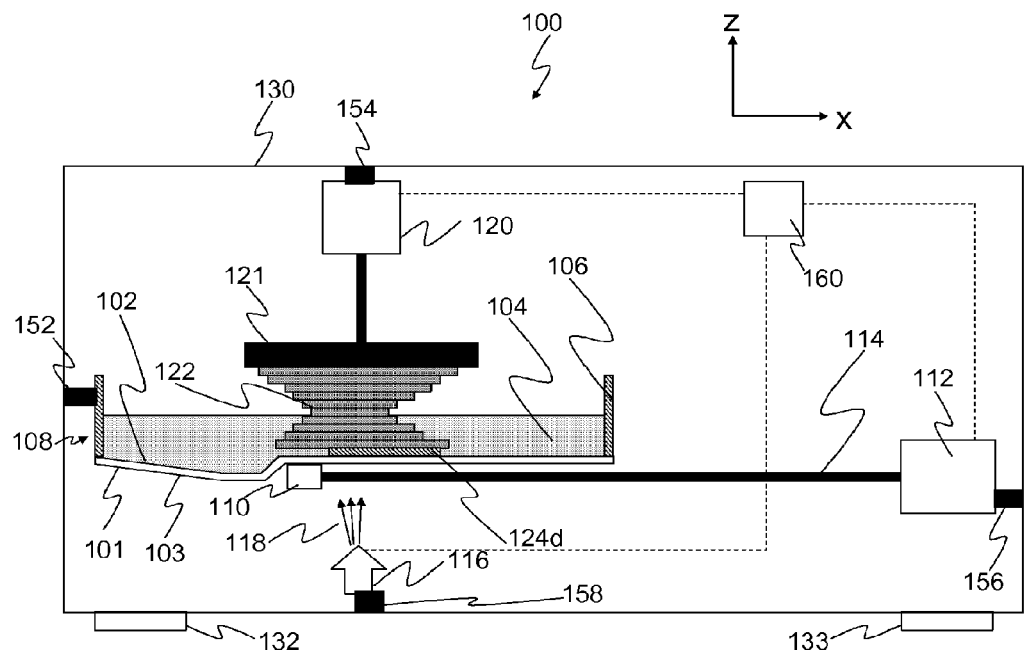

It is possible to use a completely opaque supporting member. For example, the light may fall on a portion of the sheet 101 adjacent the leading 436 or trailing edge 438 of the member, as depicted in FIGS. 35 and 36. The member of this embodiment may not, however, necessarily be opaque.

Figure 15:
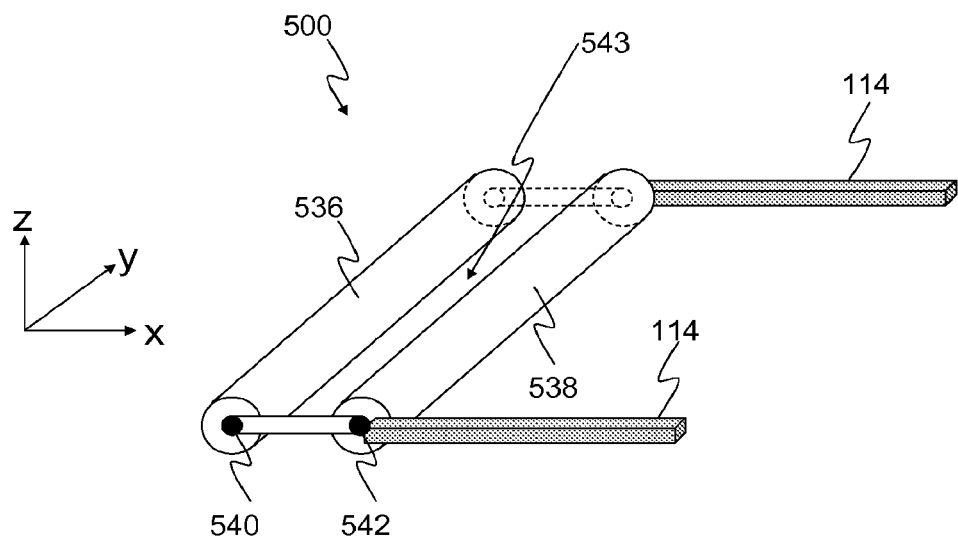

FIG. 15 shows a second type of supporting member apparatus 500 comprising two rollers 536 and 538 free to rotate around their axes on bearings 540 and 542. The rollers support the sheet 101 as the member apparatus is moved underneath the sheet. There is a gap, a window 543, between the two rollers through which the light can pass. The gap can be made arbitrarily narrow so that the amount of membrane sag in this gap is acceptable. The use of rollers reduces the effect of friction between the member and the sheet 101. Again, raster light sources such as a laser scanning apparatus operating in raster mode or a digital multimedia projector are suitable for use in conjunction with such a member.

Figure 16:
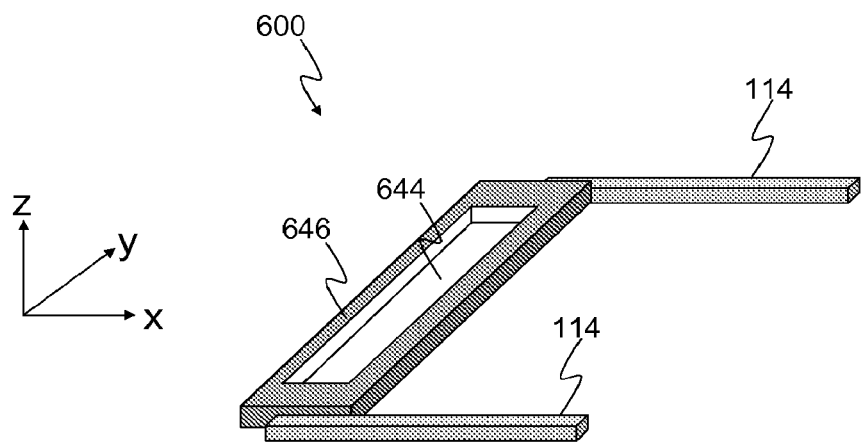
Figure 17:
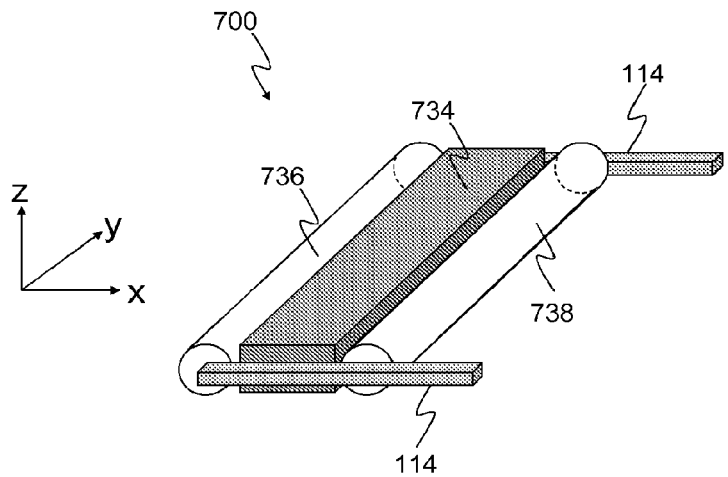

FIG. 16 shows another embodiment of a member 600. It comprises an elongated window 644 surrounded by a frame 646. The frame 646 may be constructed, for example, from aluminium or stainless steel, and thus offers a means of implementing an embodiment of the present invention without using expensive transparent materials.

Elements of the presented embodiments of a member may be combined. For example, any member may be enhanced by adding a roller at its leading edge and/or its trailing edge to minimise friction between it and the sheet, as depicted by the apparatus 700 in FIG. 17 comprising rollers 736,738 and window 734.

Some embodiments of the member may fully support the area of the sheet presented for exposure to the light. In this case a slightly different operating procedure may be employed for forming a layer of material, hardening it to form a section, and separating the section from the provided surface.

FIGS. 18 to 24 show another embodiment of an apparatus at which an object can be made generally indicated by the numeral 800, where parts similar to those in the embodiment of FIG. 1 are similarly numbered. The figures taken in sequence indicate one method with which the apparatus forms and separates a section according to an embodiment of a method for making an object.

Figure 18:
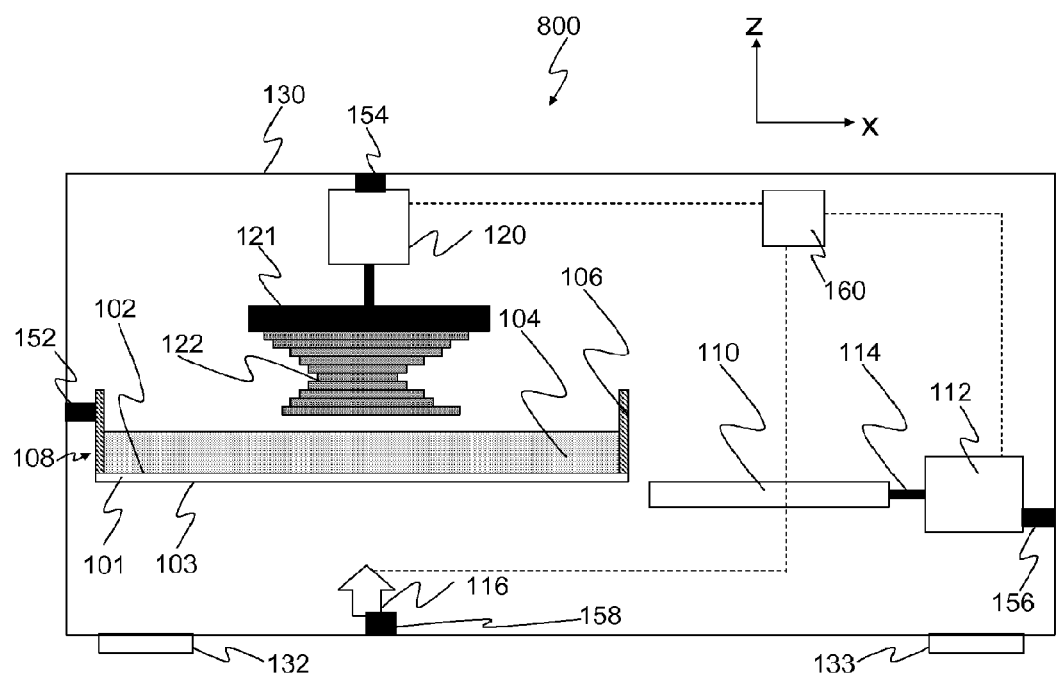
FIGS. 18 to 24 show schematic elevation views of another embodiment of a device for making an object.
Figure 19:
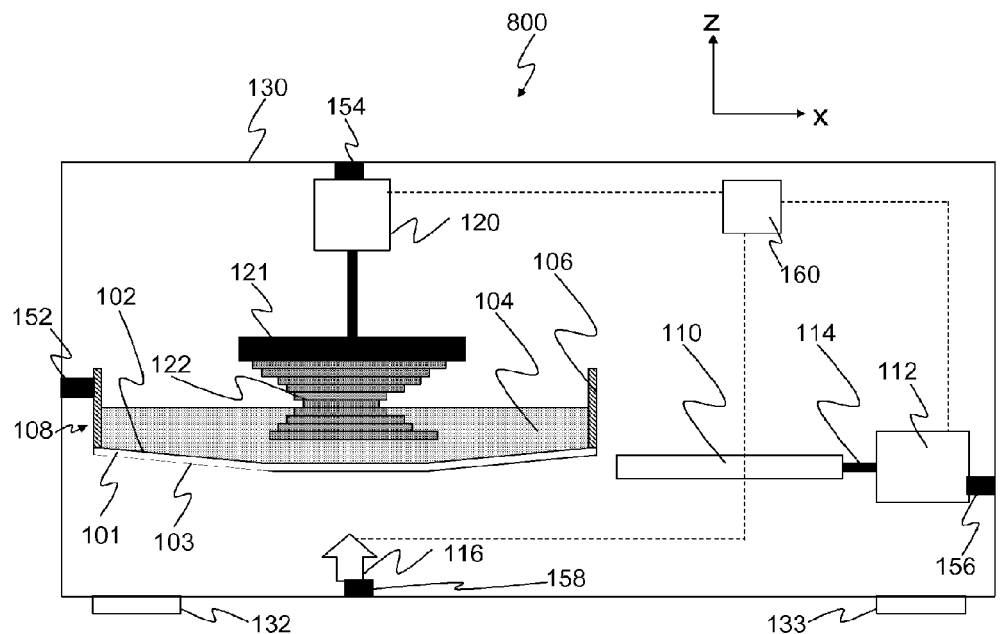
Figure 20:
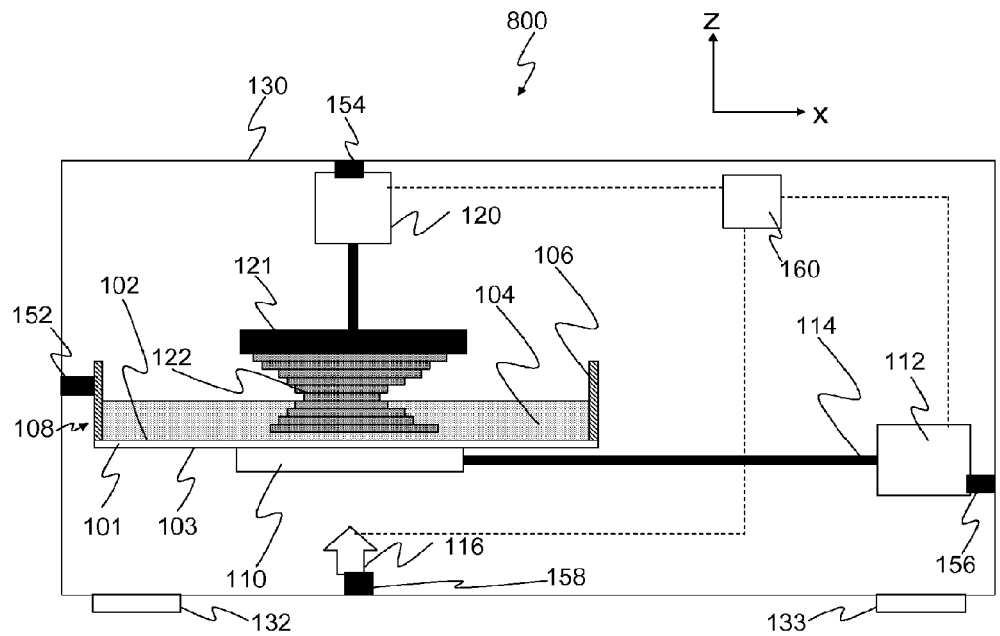
Figure 21:
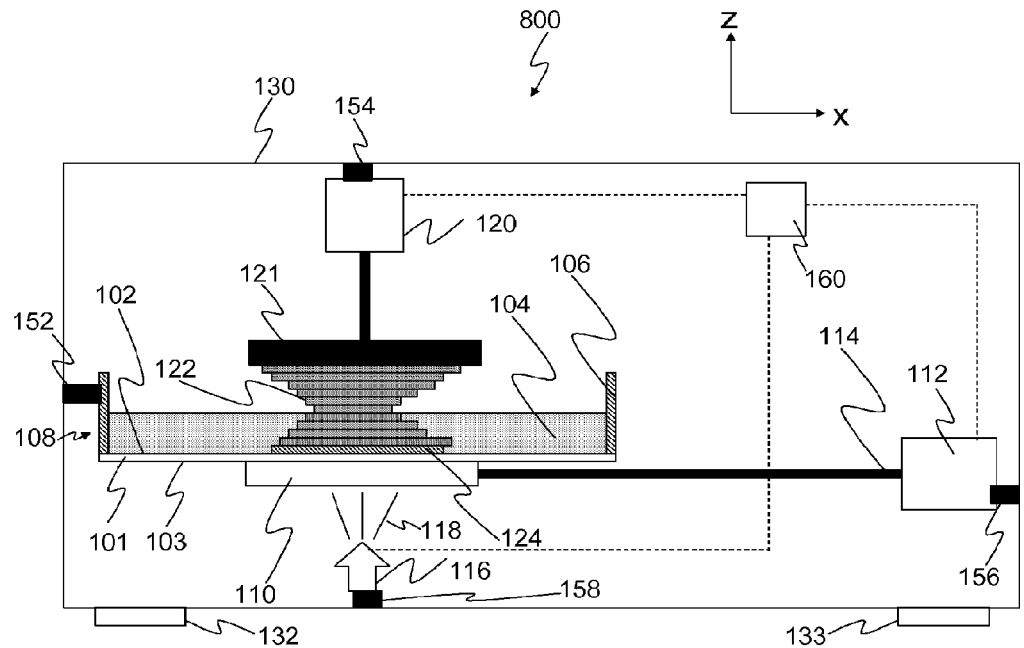
Figure 28:
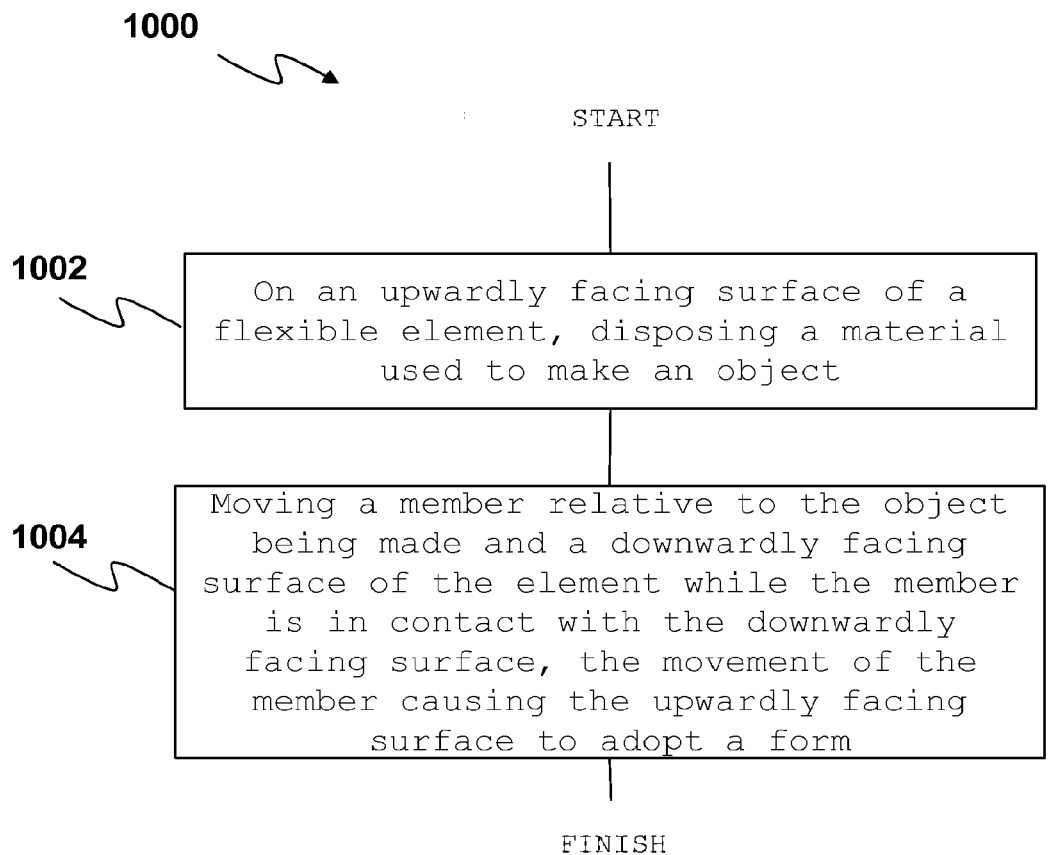
FIG. 28 shows a flow diagram of an embodiment of a method for making an object.

The following sequence of actions may be performed with the apparatus 800 to form a new solid section 124 and non-destructively separate it from the sheet 101. The process begins with the previous sections of the object being built 122 a distance from the sheet 101 and the member 110 retracted from the underside of the sheet 104, as shown in FIG. 18. Next, mechanical actuator 120 lowers the object being built 122 towards the sheet 101 to a final position which is one section-thickness above the sheet surface 102 when in the flat configuration. The sheet 101, not being supported, will deflect away from the object 122 as shown in FIG. 19 resulting in a separation generally greater than one section thickness. Next, mechanical actuator 112 is engaged to move the member 110 along the underside the sheet as shown in FIG. 20. This corresponds to step 1004 of the method shown in FIG. 28 generally indicated by numeral 1000. This action lifts the sheet 101 to its level position while forcing excess photohardenable liquid 104 out of the gap between the previously hardened sections 122 and the sheet 101. Next, structured light 118 in accordance with the cross-sectional geometry of the object under construction is emitted from light source 116 to selectively harden regions of the layer of photohardenable liquid 104 in contact with the previously formed sections 122 to form a new solid section 124, as shown in FIG. 21. The light source 116 may project a rasterised image, or it may operate in a vector scanning mode. The member 110 provides a support for the sheet 101 to prevent sagging during the exposure, that is, the exposure takes place through the member 110.

Figure 22:
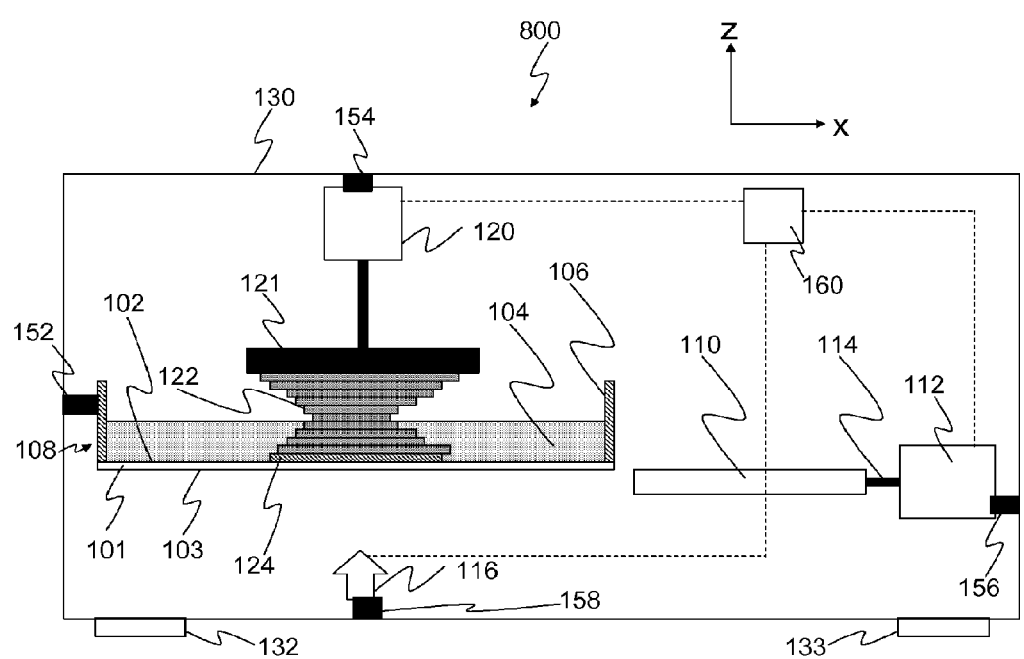

Next, mechanical actuator 112 is engaged to retract the member 110 from the underside of the previously hardened section 124, as shown in FIG. 22.

Although the movement of the member is, in the presented embodiments, parallel to the nominal plane of the sheet and thus horizontal, it need not be strictly horizontal. Some degree of non-horizontal movement may be accommodated by a corresponding distortion of the flexible member. Consequently, the relative movement may have a component parallel to the surface (that is, perpendicular to the direction of the gravitational force), but also some component perpendicular to the surface. The resultant movement may be substantially parallel to the surface.

Figure 23:
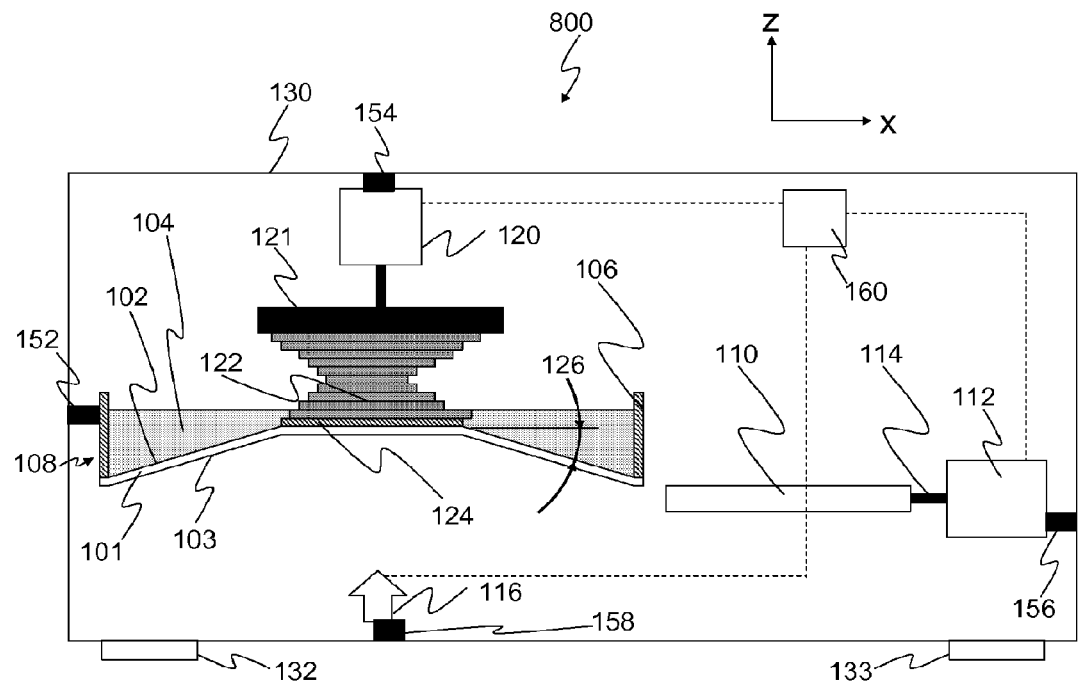
Figure 24:
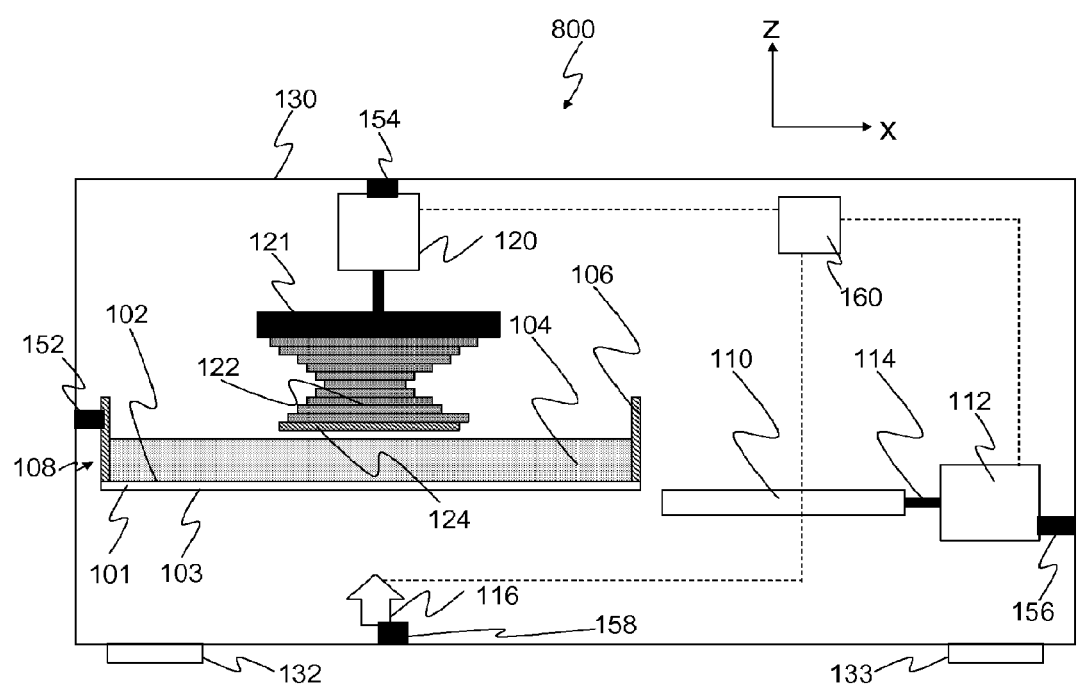

Next, positioner 120 is actuated to raise the previously formed sections 122 and newly formed section 124 past the level position of the membrane, as shown in FIG. 23. Once the peeling angle 126 is sufficient the membrane will peel away from the newly formed section 124 and the apparatus is ready for the process to start again, as shown in FIG. 24. Repeating this sequence of actions enables a multilaminate object to be fabricated section by section.

In the embodiments of FIGS. 1 to 11 and 18 to 24, the fluid contained in the trough flows over the surface under the influence of gravity, causing the fluid to be disposed on the surface. Alternatively, the fluid may be periodically applied over the surface from a nozzle, or applied with a wiping action similar to the action of a windscreen wiper blade.

Figure 25:
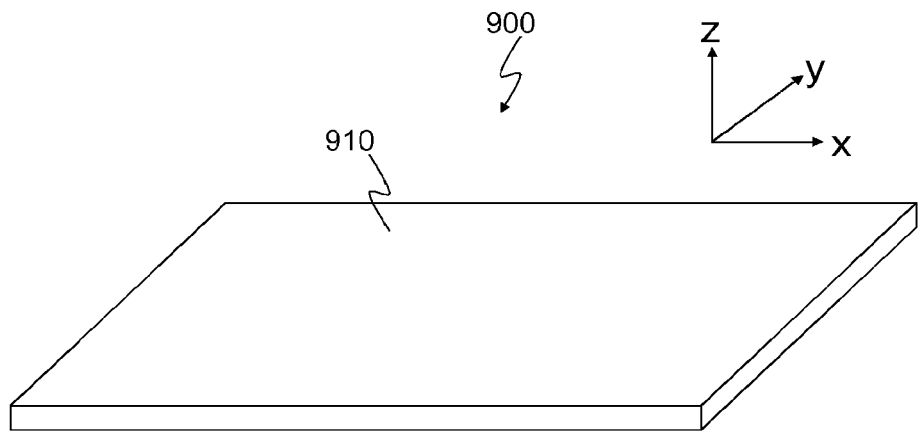
FIGS. 25 to 27 show perspective views of further examples of a member that may form part of a device for making an object.

One embodiment of a member which fully supports the radiation-exposed area of the sheet is shown in FIG. 25 generally indicated by the numeral 900. It comprises a plate 910 of material transparent to the light from light source 116. It may, for example, be fabricated from fused silica when light of wavelength 405 nm is used. Alternatively, the plate may be fabricated from poly(methyl methacrylate) (PMMA), polycarbonate, soda-lime glass or any other suitable material that is sufficiently transparent to the particular actinic light used.

Figure 26:
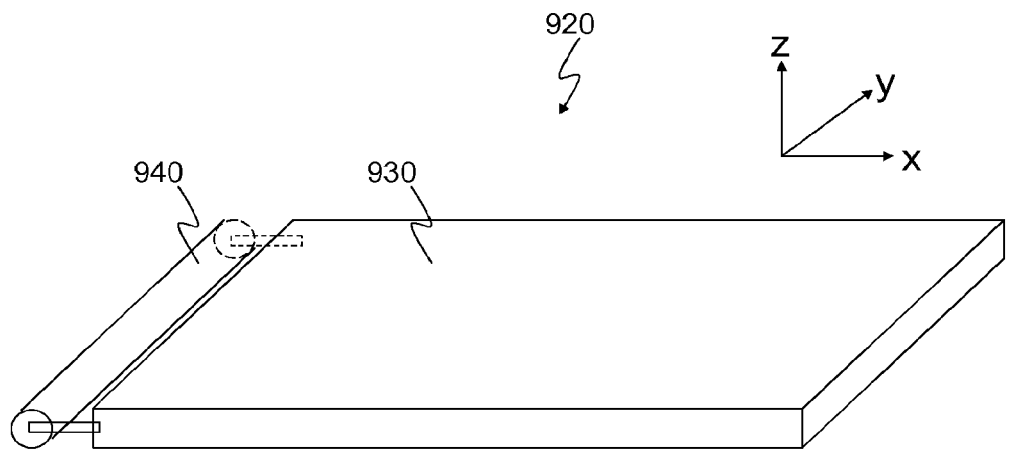

A second embodiment of a member which fully supports the sheet is shown in FIG. 26 generally indicated by the numeral 920. It comprises a plate of transparent material 930 with a roller 940 at its leading edge free to rotate around its axis. The roller reduces the effects of friction between the membrane and the plate, as the greatest force may be at the member's leading edge which is responsible for pushing material out of the gap between the sheet 101 and the previously formed section of the object 122.

Figure 27:
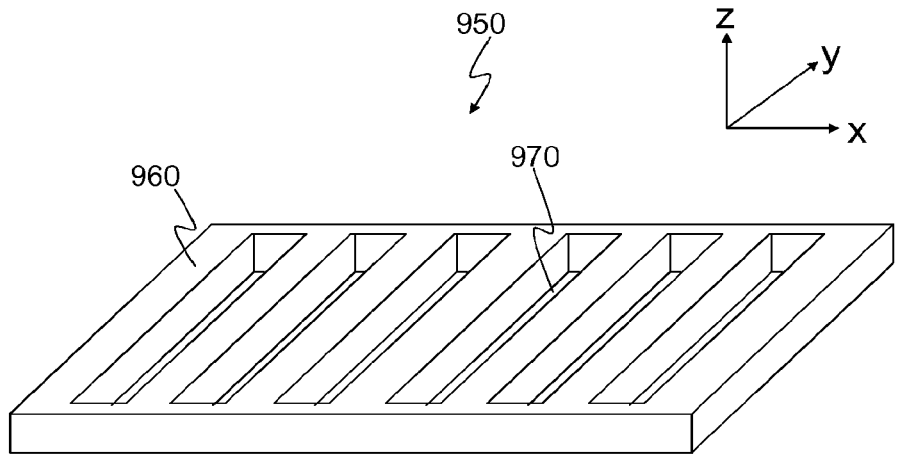

Another embodiment of a member is shown in FIG. 27 generally indicated by the numeral 950. It comprises a plate 960 with windows such as 970 cut in it. The material of construction may be opaque, such as, for example, stainless steel. The mode of operation of this member is to support the sheet in one position while light is projected through the windows of the member, and then the member is moved to a second position such that the previously obscured regions of the fabrication area are now exposed and a second exposure is made through the windows.

Figure 34:
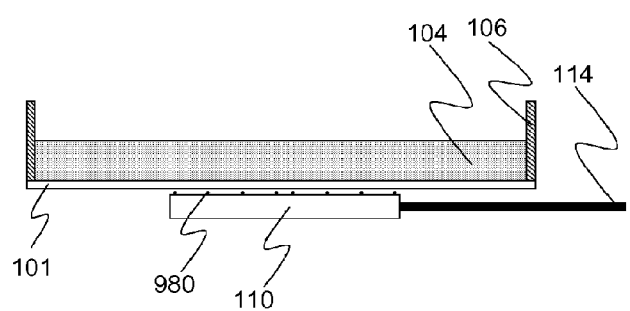
FIG. 34 shows a schematic view of a friction reducing substance between an example flexible element and an example member.

Friction between the member and sheet may be exacerbated by the presence of moisture or contaminants between the member and the sheet. This friction can be reduced by adding a substance between the member and the sheet as indicated by substance 980 in FIG. 34. The substance may be, for example, a liquid lubricant such as a mineral or silicon oil, or a powdered solid such as talcum powder. Powdered metal soaps such as magnesium stearate may be particularly effective for this purpose. Particles of powder may behave like tiny ball-bearings and thereby reduce friction. A light dusting of powder can have a significant friction-reducing effect whilst having negligible impact on optical transmission through the member and the sheet.

Figure 38:
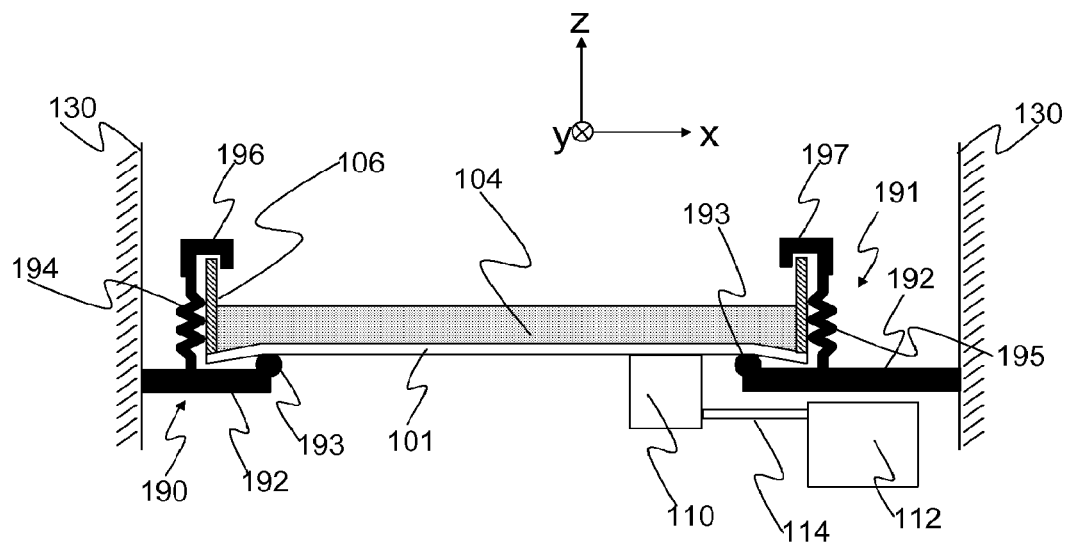
FIG. 38 shows an example of a tensioner that may be to incorporated into a device for making a solid object.

FIG. 38 shows a representation of an example tensioner, opposite sides of which are indicated by numerals 190,191. The tensioner may be incorporated into a device for making a solid object, such as, but not limited to, any one of the depicted embodiments. The tensioner may be used to tension the sheet 101, keeping it taut. The tensioner is mounted to the chassis of the apparatus 130. The tensioner includes a frame 192 and a sheet-contacting component 193 in the form of a ring attached to the frame. The sheet contacting component is, in use, in contact with the downwardly facing surface of the sheet 101. The sheet-contacting component 193 may have any suitable form, such as square or oval. The parts of the sheet contacting component 193 may not have sharp edges and corners to prevent puncture or localized yielding of the sheet 101. The tensioner may comprise one or more biasing elements that bias the sheet-contacting component towards the downwardly facing surface of the sheet 101. The one or more biasing elements may comprise a spring arrangement having extension springs 194,195, for example, operationally coupled to the sheet and the frame. In other embodiments, the biasing members may comprise rubber, extension springs, leaf springs, or any other suitable biasing means. A hook or grip 196,197 at one end of the spring 194,195 is hooked over the side wall 106 of the trough or dish. The other end is attached, hooked or tethered to the frame. When so placed, the spring, in this but not necessarily all embodiments, is in tension. The biasing elements may, alternatively or additionally, comprise electromechanical elements, such as a motor, or magnets (either electromagnets or permanent magnets). The downwardly facing surface is also biased into the frame, in this but not necessarily all embodiments, by gravity. The tensioner may not, in all circumstances, be sufficient, however, to prevent sag of the sheet 101 under gravity. A member as described above, such as 110, may assist in ameliorating any sag.

The tensioner may alternatively comprise a biasing element between the sheet 101 and the side wall 106 of the trough or dish. In this but not necessarily in all embodiments, the tensioner acts around the perimeter of the sheet thereby maintaining tension in both the x and y directions.

The tensioner may prevent the sheet, if not tensioned, from interfering with the moving member. The tensioner may prevent the sheet from creasing or being ripped by the moving member.

Figure 37:
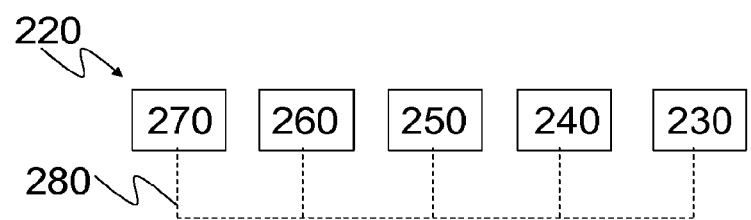
FIG. 37 shows an example architecture of a controller for controlling the devices of the preceding figures.

The actuator for the member 112, the positioner 120, the light source, and possibly other parts of the apparatus may be in communication with and may be controlled by a controller 160 to coordinate the apparatus to make the object. These and other components may be connected by wires, cables, wireless, or any other suitable means. In this embodiment, the controller may have a processor unit 220, schematically illustrated in FIG. 37. The processor unit 220 may include a suitable logic device 250 such as, or similar to, the INTEL PENTIUM or a suitably configured field programmable gate array (FPGA), connected over a bus 280 to a random access memory 240 of around 100 Mb and a non-volatile memory such as a hard disk drive 260 or solid state non-volatile memory having a capacity of around 1 Gb. The processor has input/output interfaces 270 such as a universal serial bus and a possible human machine interface 230 e.g. mouse, keyboard, display etc. Device components may be controlled using commercially available machine-to-machine interfaces such as LABVIEW software together with associated hardware recommended by the commercial interface provider installed on the processor unit 220, over USB or RS-232 or TCP/IP links, for example. Alternatively, custom driver software may be written for improved performance together with custom printed circuit boards. Alternatively, the processor unit 220 may comprise an embedded system.

In this embodiment, the controller 160 is in communication with another processor which is adapted for determining instructions and/or information for the device. In alternative embodiments, the processors are the same processor. An example of another processing unit comprises a logic device such as, or similar to, the INTEL PENTIUM or a suitably configured field programmable gate array (FPGA), connected over a bus to a random access memory of around 100 Mb and a non-volatile memory of such as a hard disk drive or solid state non-volatile memory having a capacity of around 1 Gb. Generally, the configuration may be similar or identical to that shown in FIG. 37. The processor has a receiver such as a USB port (or Internet connection, for example) for receiving information representing a solid object, stored on a USB FLASH device, for example. The information may be encoded in a file generated by a Computer Aided Design (CAD) program, the information specifying the geometry of the object. The microprocessor runs a decomposer program implementing an algorithm that decomposes (or transforms) the information into data indicative of a plurality of sections to be formed sequentially by the device, the material being used to make the solid object. The program may have been installed onto the processor from tangible media such as a DVD or USB memory stick, for example, that stored the program. In an alternative embodiment, the decomposer may be a dedicated hardware unit. A series of sections through the object are determined, each section corresponding to a solid section to be formed. The sections may then be further processed to represent the geometry of each section as a rasterised bitmap. The sections or bitmaps may then used to control the device.

It will be appreciated that the apparatus and method may be used to make an object of generally any shape or size, including jewelry such as rings, prototype car components, microcomponents for precision machines, models for investment casting, and architectural or design features for a building.

Now that embodiments of the invention have been described, it will be appreciated that some embodiments may have some of the following advantages:

- the flexible element may distort when the solid section and surfaces are separated, causing the surface to peel away from the solid section, in which case the object being formed experiences reduced forces than that generated when separating the section from the surface by other ways, consequently the risk of damage to the solid section and/or the object being made is reduced;
- having the fluid disposed over the surface requires a relatively modest volume of fluid, reducing costly waste;
- the member supporting the flexible element ameliorates sagging of the flexible element under the force of gravity, thereby improving the flatness of the solid sections and reducing distortions in the object;
- moving the member substantially parallel to the flexible element requires less force than perpendicular separation of the member and the flexible element, enabling the making of more delicate objects.
- moving the member away from beneath the hardened section prior to separating it from the flexible element allows air to reach the downward side of the flexible element. This allows the flexible element to distort freely and facilitate peeling of the section, whereas atmospheric pressure may prevent free distortion of the flexible element if the member remains beneath the flexible element.
- the direction of the force applied by the horizontally moving member on the flexible member (sheet) is tangential to the member, and not orthogonal to the member, so that the member may then tension and take at least some of the force instead of the force being transferred to the object being made. This may protect the object from at least some of the force.

It will be appreciated that numerous variations and/or modifications may be made to the invention as shown in the specific embodiments without departing from the spirit or scope of the invention as broadly described. It is to be noted that while the above text refers to members being moved by actuators in a linear fashion, that is, in a straight line, it is to be understood that the present invention is also applicable to members being actuated in other ways, such as by rotary action, similar to the manner in which a car's windscreen wiper operates. The member may in that case be embodied with a curved edge instead of a straight edge. The flexible element may not be flat like a sheet, but rather may be wedged. The downwardly facing surface of the element may be textured. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method for making an object, the method comprising the steps of:
   on a surface of a flexible element, disposing a material used to make the object; and
   tautening the flexible element in a first direction and a second direction perpendicular to the first direction by biasing at least one of a flexible element contacting component in contact with the flexible element and the flexible element towards the other.

2. A method defined by claim 1 wherein at least one of the flexible element contacting component and the flexible element is biased towards the other by at least one biasing element.

3. A method defined by claim 2 wherein the at least one biasing element comprises a spring arrangement.

4. A method defined by claim 3 wherein the spring arrangement comprises at least one of an extension spring and a leaf spring.

5. A method defined by claim 1 wherein at least one of the element contacting component and the flexible element is biased towards the other by gravity.

6. A method defined by claim 1 comprising the step of a flexible element contacting component acting adjacent a perimeter of the flexible element.

7. A method defined claim 2 wherein the flexible element forms at least part of a vessel configured to contain the material and comprising the step of hooking the biasing element over a side wall of the vessel.

8. A method defined by claim 1 wherein the flexible element contacting component is in contact with another surface of the flexible element that is opposite the surface.

9. A method defined by claim 1 wherein the surface is upwardly facing and the flexible element contacting component is in contact with a downwardly facing surface of the flexible element.

* * * * *